US009998706B2

(12) United States Patent
Ijams et al.

(10) Patent No.: US 9,998,706 B2
(45) Date of Patent: Jun. 12, 2018

(54) VIDEO CONFERENCE ENDPOINT DISPLAYS

(71) Applicant: Cisco Technology, Inc., San Jose, CA (US)

(72) Inventors: Stephen L. Ijams, San Jose, CA (US); Shawn E. Bender, Campbell, CA (US); Thomas M. Fussy, Portola Valley, CA (US); Ciaran M. Hamilton, Campbell, CA (US); Damon C. Campbell, Pacific Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 116 days.

(21) Appl. No.: 14/630,158

(22) Filed: Feb. 24, 2015

(65) Prior Publication Data

US 2016/0142675 A1    May 19, 2016

Related U.S. Application Data

(60) Provisional application No. 62/079,117, filed on Nov. 13, 2014.

(51) Int. Cl.
*A44B 1/18*      (2006.01)
*A44B 13/00*   (2006.01)
(Continued)

(52) U.S. Cl.
CPC ............ *H04N 7/142* (2013.01); *G09F 9/3026* (2013.01)

(58) Field of Classification Search
CPC ........ A47B 2083/006; A47B 2097/006; A47B 21/02; A47B 21/03; A47B 2200/0071; H04N 19/105; H04N 19/46; H04N 19/51; H04N 19/513; H04N 19/52; G02B 26/005; G02F 1/13305; G02F 1/13336; G02F 1/13338; G02F 1/133553
USPC .............. 348/14.07, 14.08, 14.09, 14.1; 248/124.1, 125.1, 125.2, 125.8, 126, 248/130–133, 200, 205.1, 207, 274.1,
(Continued)

(56) References Cited

U.S. PATENT DOCUMENTS

| 4,920,458 A | 4/1990 | Jones |
| 5,832,646 A * | 11/1998 | Albin ..................... A47G 1/142 40/757 |

(Continued)

FOREIGN PATENT DOCUMENTS

EP         2171339 B1    6/2011

OTHER PUBLICATIONS

Cisco, "Cisco TelePresence System 3000 Assembly Guide Use & Care Guide Field-Replaceable Unit Guide," Oct. 31, 2008, 248 pages.
(Continued)

*Primary Examiner* — Binh Kien Tieu
(74) *Attorney, Agent, or Firm* — Edell, Shapiro & Finnan, LLC

(57) ABSTRACT

Presented herein is a display mounting system for an immersive multi-display (multi-screen) telepresence/videoconference endpoint. The display mounting system includes a mounting mechanism configured to movably mount one or more displays to a support frame. A first adjustment mechanism is configured to rotate the display with respect to the frame, while a second adjustment mechanism is configured to tilt the display with respect to the frame.

20 Claims, 16 Drawing Sheets

(51) Int. Cl.
   *F16M 13/02* (2006.01)
   *H04N 7/14* (2006.01)
   *G09F 9/302* (2006.01)

(58) Field of Classification Search
   USPC ...... 248/282.1, 284.1, 917–923; 361/679.01, 361/679.02, 679.04, 679.06
   See application file for complete search history.

(56) References Cited

U.S. PATENT DOCUMENTS

| | | | |
|---|---|---|---|
| 6,186,462 B1 | 2/2001 | Schechtel et al. | |
| 6,449,143 B2* | 9/2002 | Rooyakkers | A47B 21/00 312/208.1 |
| 6,690,337 B1 | 2/2004 | Mayer, III et al. | |
| 6,695,270 B1* | 2/2004 | Smed | F16M 11/10 248/274.1 |
| 6,930,702 B1 | 8/2005 | Ferren et al. | |
| 7,061,754 B2* | 6/2006 | Moscovitch | F16M 11/10 248/917 |
| 7,369,401 B1* | 5/2008 | Floersch | F16M 11/08 292/301 |
| RE42,091 E* | 2/2011 | Moscovitch | B60R 11/02 348/794 |
| 8,000,090 B2* | 8/2011 | Moscovitch | F16M 11/105 361/679.04 |
| 8,083,189 B2* | 12/2011 | Sun | F16M 11/08 248/122.1 |
| 8,102,331 B1* | 1/2012 | Moscovitch | G06F 1/16 248/917 |
| 8,282,052 B2* | 10/2012 | Huang | F16M 11/045 248/125.1 |
| 8,342,462 B2* | 1/2013 | Sapper | F16M 11/10 248/124.1 |
| 8,462,103 B1* | 6/2013 | Moscovitch | B60R 11/02 345/1.1 |
| 8,596,599 B1* | 12/2013 | Carson | B60R 11/0235 211/26 |
| 8,783,193 B2* | 7/2014 | Scharing | A47B 21/00 108/102 |
| 8,797,377 B2 | 8/2014 | Mauchly et al. | |
| 8,814,115 B2 | 8/2014 | Muday et al. | |
| 8,824,124 B1* | 9/2014 | Carlson | G06F 3/1446 361/622 |
| 9,743,757 B2* | 8/2017 | Ergun | A47B 21/02 |
| 9,746,124 B2* | 8/2017 | Smed | F16M 11/10 |
| 9,746,130 B2* | 8/2017 | Hung | G06F 1/1601 |
| 2004/0123548 A1* | 7/2004 | Gimbel | E04B 1/6162 52/582.1 |
| 2005/0007445 A1 | 1/2005 | Foote et al. | |
| 2005/0210722 A1* | 9/2005 | Graef | G09F 9/30 40/452 |
| 2008/0237424 A1 | 10/2008 | Clary et al. | |
| 2009/0096861 A1 | 4/2009 | Salch et al. | |
| 2009/0133609 A1* | 5/2009 | Nethken | A47B 21/02 108/50.02 |
| 2011/0075345 A1* | 3/2011 | Moscovitch | F16M 11/04 361/679.22 |
| 2012/0047785 A1* | 3/2012 | Swick | A47G 1/065 40/729 |
| 2013/0146727 A1 | 6/2013 | Oh | |
| 2013/0260362 A1* | 10/2013 | Melashenko | G09B 19/00 434/430 |
| 2013/0334376 A1* | 12/2013 | Moscovitch | B60R 11/02 248/125.1 |
| 2013/0335507 A1* | 12/2013 | Aarrestad | H04N 7/15 348/14.08 |
| 2014/0103181 A1 | 4/2014 | Duerigen et al. | |
| 2014/0245932 A1* | 9/2014 | McKenzie, III | A47B 21/02 108/50.01 |
| 2015/0056600 A1* | 2/2015 | Melashenko | G09B 19/00 434/428 |
| 2016/0014882 A1* | 1/2016 | Jongman | H01L 27/3293 361/749 |

OTHER PUBLICATIONS

Cisco, "Cisco TelePresence TX9000 Series," Data Sheet, Jan. 2014, 6 pages.
Cisco, "Cisco TelePresence System 3000," Data Sheet, Jan. 2010, 6 pages.
Cisco, "Cisco TelePresence System TX9000 and TX9200 Assembly, Use & Care, and Field-Replaceable Unit Guide," Dec. 3, 2014, 470 pages.

* cited by examiner

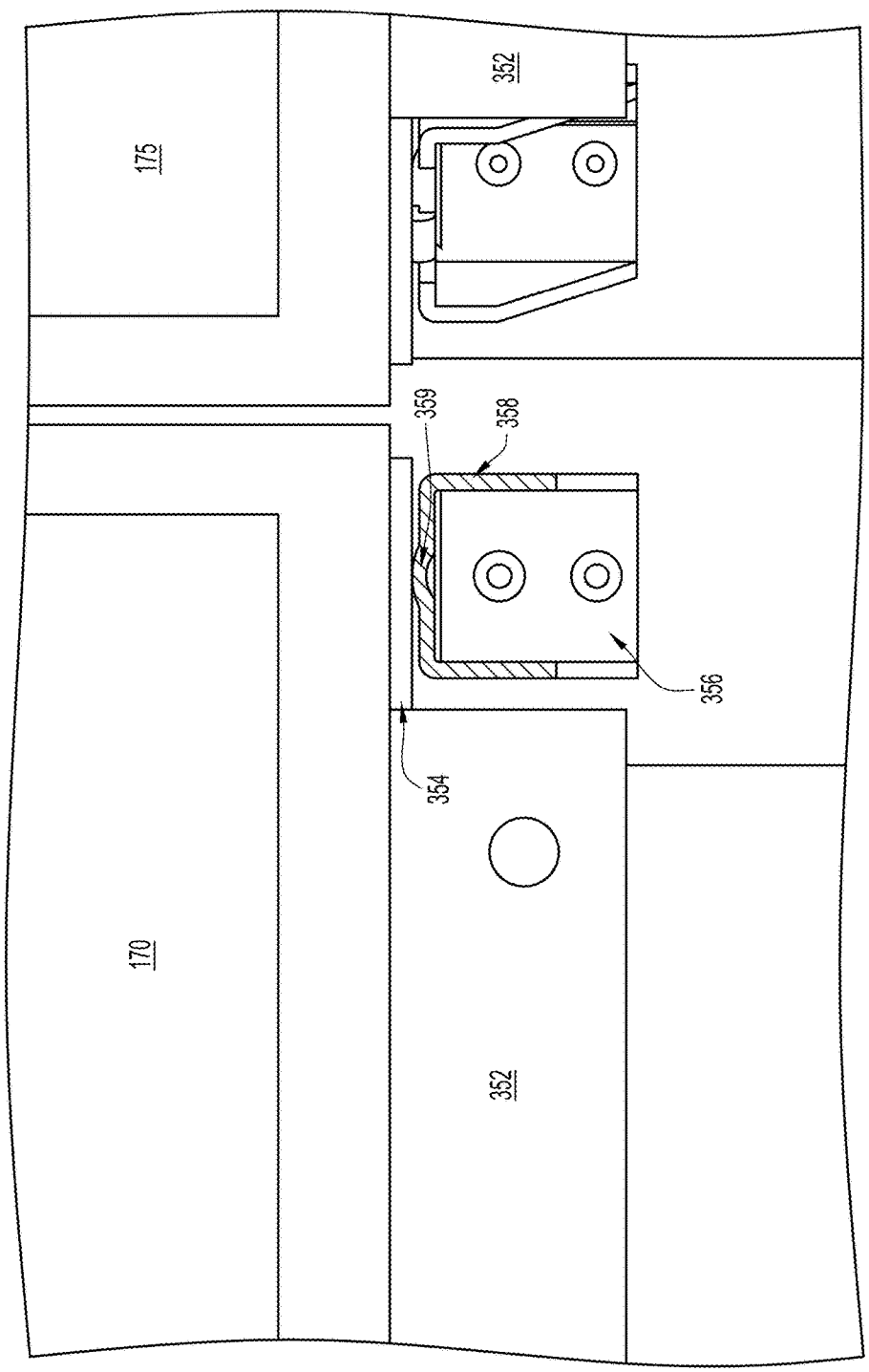

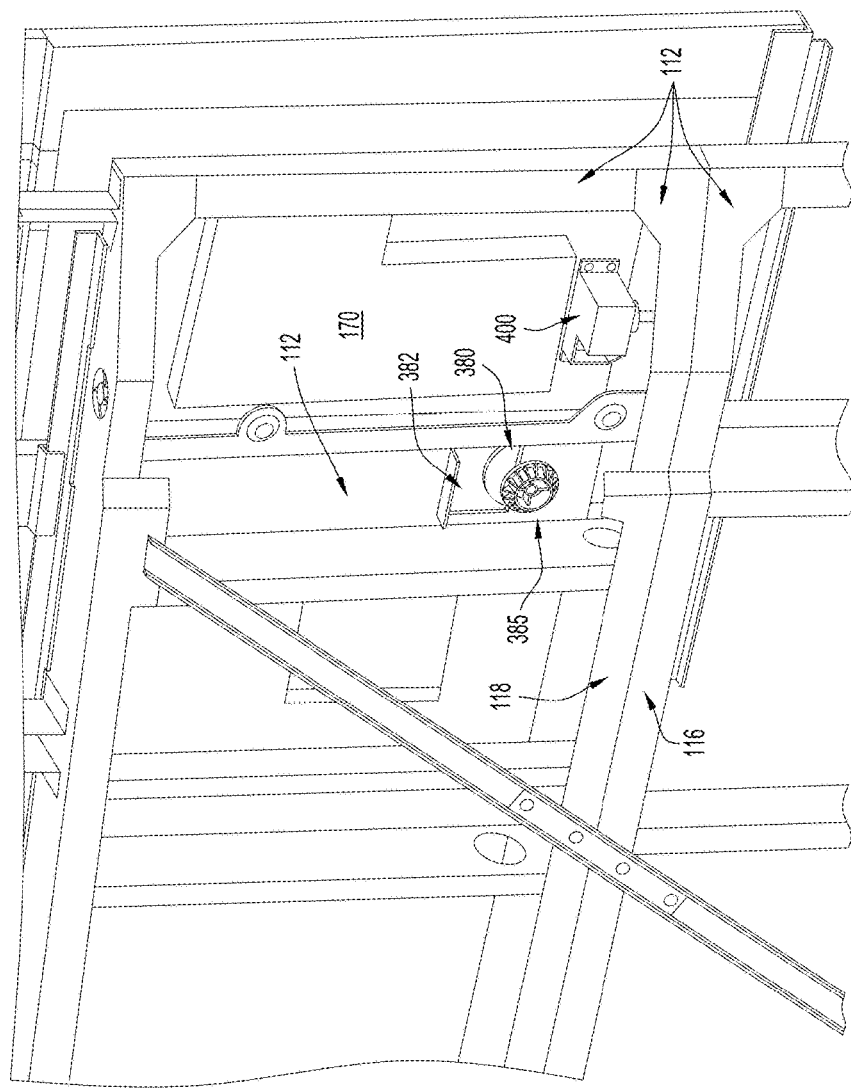

VIDEO CONFERENCE ENDPOINT DISPLAYS

CROSS-REFERENCE TO RELATED APPLICATIONS

This application claims priority to U.S. Provisional Application No. 62/079,117, filed Nov. 13, 2014, the entirety of which is incorporated herein by reference.

TECHNICAL FIELD

The present disclosure relates to video conference systems.

BACKGROUND

Video conference systems, sometimes referred to as video conference, videoconference, teleconferencing, telepresence, or collaboration systems, allow meetings between persons or groups of people at different locations. Video conference systems may include equipment configured to provide both video and audio communication between the different locations.

For example, certain video conference systems include endpoints that are equipped with multiple cameras and multiple displays configured to capture and present, respectively, different video streams. The video streams can be classified as participant streams (i.e., video captured by cameras and containing views of meeting participants) or data content streams (i.e., computer generated graphical content presented by meeting participants).

BRIEF DESCRIPTION OF THE DRAWINGS

FIGS. 7 and 8 are front perspective views of a portion of a video conference endpoint that includes brackets for a center and side display in accordance with an example embodiment, with FIG. 8 including a partial sectional view of a mounting bracket.

FIGS. 9A and 9B are rear perspective views of portions of a side portion of a video conference endpoint that includes adjustment mechanisms in accordance with an example embodiment.

DESCRIPTION OF EXAMPLE EMBODIMENTS

Overview

Figure 1:
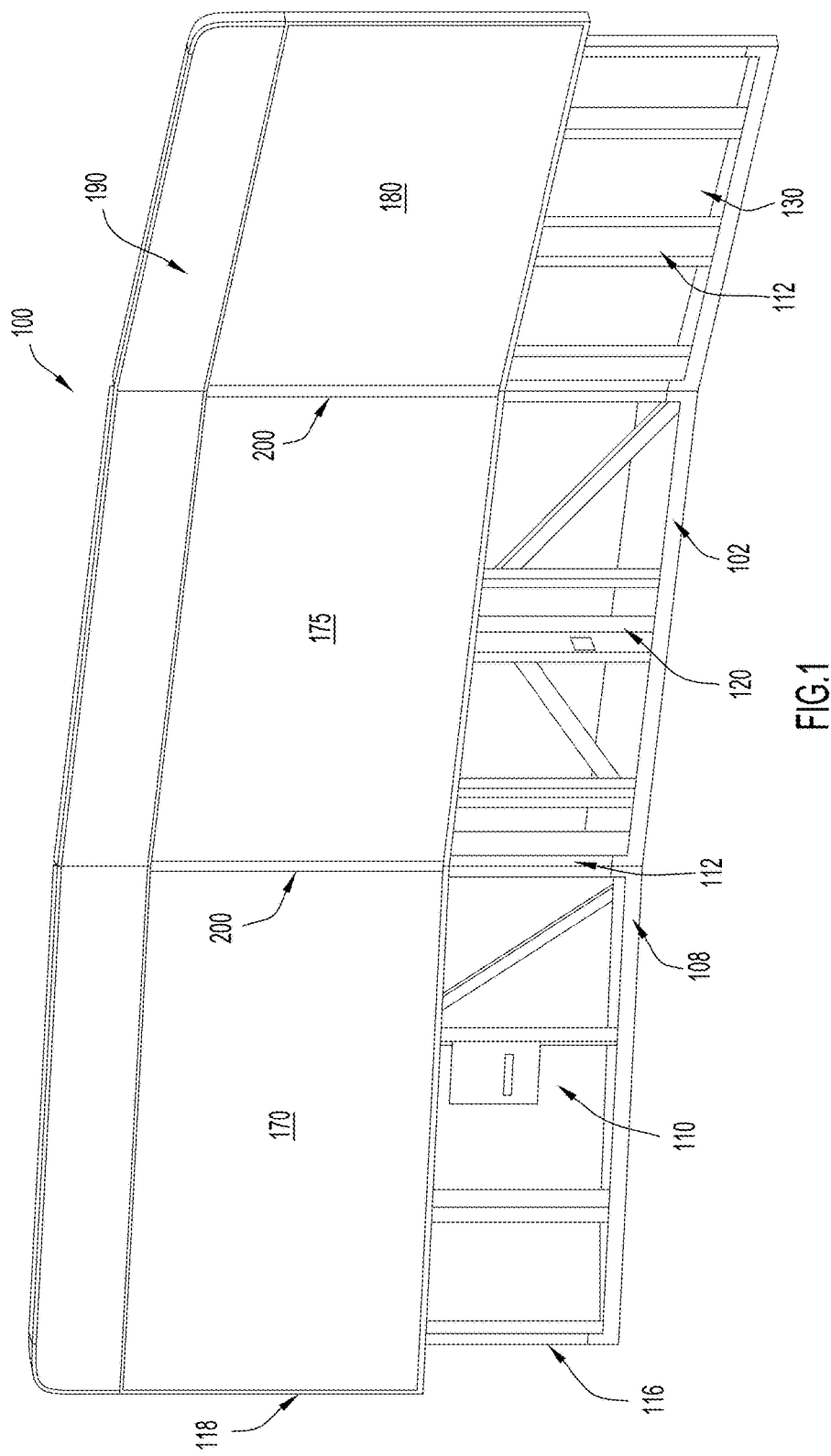
FIG. 1 is a front perspective view of a video conference endpoint in accordance with an example embodiment.

Presented herein is display mounting system for an immersive multi-display (multi-screen) telepresence/videoconference endpoint. The display mounting system includes a mounting mechanism configured to movably mount one or more displays to a support frame. A first adjustment mechanism is configured to rotate the display with respect to the frame, and a second adjustment mechanism is configured to tilt the display with respect to the frame.

Example Embodiments

Immersive telepresence or video conference systems typically include systems/endpoints with multiple (e.g., 3) relatively large screens/displays (display panels/screens) mounted side by side. The multiple displays may have a selected angular orientation and may be supported by an internal structural frame. For ease of description, the term "display" is used herein to describe screens, displays, etc., but it is to be understood that any desirable device, display, screen, etc. may be used with the endpoint described herein.

Additionally, for ease of illustration, display mounting systems in accordance with examples presented herein are described with reference to the mounting of three (3) displays in a side-by-side arrangement. The three displays are referred to herein as including a center or central display and two side displays, namely a "first" or "left" display and a "second" or "right" display. It is to be appreciated that other numbers of displays may be mounted in accordance with examples presented herein. It is also to be understood that terms such as "left," "right," "top," "bottom," "front," "rear," "side," "height," "length," "width," "upper," "lower," "interior," "exterior," "inner," "outer," "forward," "rearward," "upwards," "downwards," and the like as may be used herein, merely describe points or portions of reference and do not limit the examples presented to any particular orientation or configuration. Further, terms such as "first," "second," "third," etc., merely identify one of a number of portions, components and/or points of reference as disclosed herein, and do not limit the examples presented herein to any particular configuration or orientation.

Presented herein are innovative systems for use in mounting multiple large displays/screens of an immersive telepresence/video conference endpoint. As noted above, display mounting systems in accordance with examples presented herein are described with reference to the mounting of three displays (comprising a center display, a left display, and a right display) in a side-by-side arrangement. The three displays may be arranged horizontally such that the center display is parallel to the front and back walls of a space (e.g., conference room) and the left and right displays are rotated or angled, with respect to the center display, about a vertical axis at a prescribed angle.

In general, a display mounting system in accordance with examples presented herein may be configured to maintain multiple displays in a substantially level position or orientation while also ensuring that the multiple displays are horizontally aligned so that video images that span two or more screens are well-aligned. Additionally, a display mounting system in accordance with examples presented herein may be configured such that the multiple displays may be mounted at prescribed angular orientations to optimize viewing angles and the multiple displays should be well aligned to the surrounding exterior covers and facades to prevent unacceptable cosmetic gaps. A display mounting system in accordance with examples presented herein may be configured to incorporate fine adjustment of the positions of the multiple displays, but the degrees of freedom/adjustability is minimized to simplify display installation and reduce endpoint installation time. Additionally, because the displays are heavy to lift and support by hand, a display mounting system in accordance with examples presented herein may enable the multiple displays to be mounted on the endpoint internal frames quickly and easily. Finally, a display mounting system in accordance with examples presented herein may have sufficient strength to rigidly support heavy (e.g., greater than 100 pound (lb.)) displays.

Turning now to FIGS. 1-5, an example of a video conference endpoint according to an example embodiment is shown. The video conference endpoint 100 includes a frame 108 with a first side section 110, a central section 120, and a second side section 130. The first side section 110 may also be referred to as the first or left section 110, the central section 120 may also be referred to herein as a second or central section 120, and the second side section 130 may also be referred to herein as a third or right section 130. Each section 110, 120, and 130 includes support members 112 extending between a base 102 and a top member 142 (best shown in FIG. 2) that is configured to support a display mounting system, at least one display, and any desirable electronic and/or mechanical elements thereon.

As shown, the support members 112 may be shaped, sized, and oriented in a variety of manners (i.e., vertical, diagonal, and horizontal support members of varying thicknesses). In some examples, the support members 112 of each frame section 110, 120, and 130 are rigidly coupled to other support members 112 disposed in the same respective frame section 110, 120, or 130. However, in such examples, the support members 112 are movably coupled to support members 112 included in one or more of the other section 110, 120, and 130, such that the frame sections 110, 120, and 130 are movable, at least slightly, with respect to each other. However, in other examples, the support members 112 may be fixedly coupled to any frame elements. For example, the support members 112 may collectively form the frame 108 that is a fixed or stationary structure and the displays mounted thereon may be configured to move with respect to the frame 108 as a result of, for example, features of a display mounting system included in or incorporated into the frame 108. In still other embodiments, the frame sections 110, 120, and 130 may be individual modules or subassemblies that can be completely uncoupled from each other for shipping and/or assembly. Alignment pins and holes in adjacent frame sections may allow the frame sections 110, 120, and 130 to be precisely aligned with each other.

Generally, the support members 112 form a "skeleton" or "skeletal-type" structural frame configured to support, include, and/or incorporate a display mounting system that is configured to receive and support displays for a video conference endpoint, as described herein. In the example shown in FIG. 1, the support members 112 of each frame section 110, 120, and 130 extends between the base 102 and top 142 (shown in FIG. 2) such that the resulting frame 108 has a cuboidal-shape with a lower portion 116 and an upper portion 118, each of which may, in some examples, include unique support members 112. In some examples, the lower portion 116 may be configured to receive and support any electronic hardware for a video conference and the upper portion 118 of each section 110, 120, and 130 may be configured to include a mounting system configured to movably support three display screens. For example, the first side section 110 receives and supports a first screen 170, the central section 120 receives and supports a second screen 175, and the second side section 130 receives and supports a third screen 180. In some examples, the upper portion 118 may also receive and store electronic hardware being used with the video conference endpoint 100 if desired. Accordingly, in some examples, the support members 112 may include or be configured to receive vents or vent fans, such as vents or fans 122 (shown in FIGS. 3-4) to enable electronics stored in any portion of the frame 108 to be properly cooled. In fact, in some examples, any electronics in lower portion 116 may be provided with its own fan 122, depending on the heat dissipated by the electronics. The fans 122 may also ensure that any displays 170, 175, 180 mounted on the frame 108 are properly cooled.

Additionally, in the example shown in FIG. 1, a cosmetic cover 190, is included over a portion of the upper portion 118 and trim members 200, which may also be referred to as trim 200, are included between the displays 170, 175, 180. In some embodiments, the cosmetic cover may act as a translucent cover or diffuser for a light source. In the example of FIG. 1, a single cosmetic cover 190 is used to cover any exposed portion of the upper portion 118 and two trim members 200 are included between the displays 170, 175, 180 to cover any gaps included therebetween. However, cosmetic cover 190 does not overlap any portion of the displays 170, 175, 180 or trim 200. However, in other examples, the endpoint 100 may include any desirable number of cosmetic covers 190 and trim members 200 configured to cover any desirable portion of the frame. For example, a cosmetic cover 190 may also cover the lower portions 116 of the frame sections 110, 120, and 130. In some embodiments, the cosmetic cover 190 includes different sections of parts to cover different portions of the endpoint 100. In some examples, the cosmetic cover 190 may be configured to conform to the edges of the displays 170, 175, 180 and the frame 108. However, in certain examples, the cosmetic cover 190 may be draped over the frame 108 and the mounting system may allow the displays 170, 175, 180 to be adjusted or moved into a position substantially aligned with the cosmetic cover 190, as is described below in further detail. Moreover, in some embodiments, trim 200 may secure the displays 170, 175, 180 to frame 108, as is described in further detail below with respect to FIGS. 12 and 13.

Figure 2:
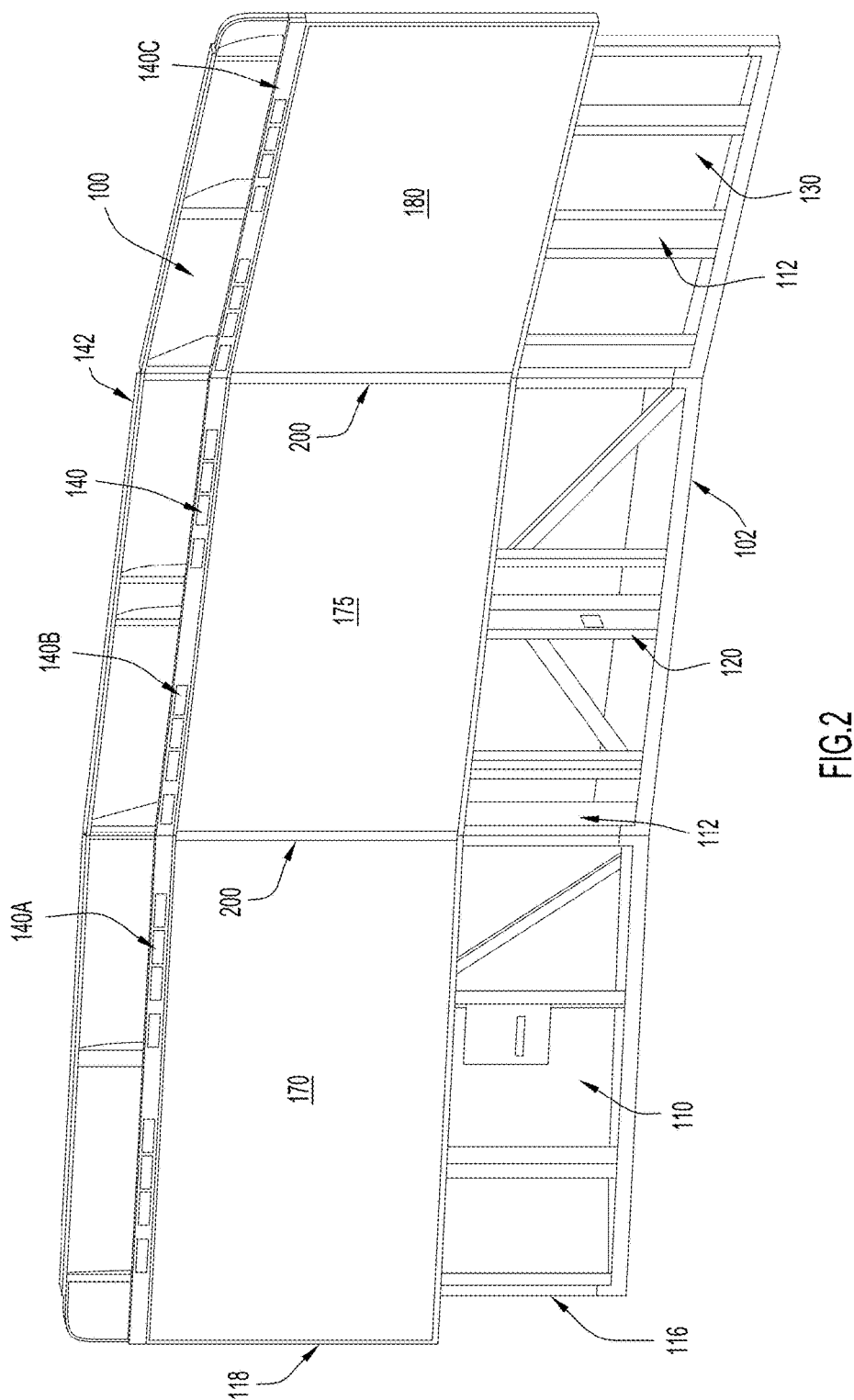
FIG. 2 is a front perspective view of a video conference endpoint in which cosmetic covers are removed to reveal an internal frame, in accordance with an example embodiment.

In FIG. 2, the endpoint 100 is still shown with the trim 200 installed, but the cosmetic cover 190 is removed. As shown when the cover 190 removed, the upper portion 118 may include a cross bar 140 that extends across the length of the frame 108. However, the cross bar 140 is formed from three sections that correspond to the sections 110, 120, and 130 of the frame 108. Accordingly, the first side section 110 includes a first section 140A of the cross bar 140, the central section 120 includes a second section 140B of the cross bar 140 and the second side section 130 includes a third section 140C of the cross bar 140. In some examples, the first and third sections 140A, 140C of the cross bar may be hingedly or otherwise movably coupled to the second section 140B in order to allow the first and second side sections 110, 130 of the frame 108 to rotate, pivot, or otherwise move with respect to the central section 120. However, in other examples, the side sections 110, 130 may be fixed to the central section 120 and the cross bar sections 140A, 140B, 140C of the cross bar may be fixedly coupled thereto or movably coupled thereto in any desirable manner which allows the cross bar sections 140A, 140B, 140C to pivot or rotate, at least slightly, with respect to each other. In the depicted embodiment, the frame sections 110, 120, and 130 are fixed to each other and the first and third cross bar sections 140A, 140C are aligned with the second section 140B and are fixed in place once secured thereto. In order to align the sections 140A, 140B, 140C keying features, such as tabs, indents, or other such features that may provide tactile feedback of alignment, may be provided.

Figure 3:
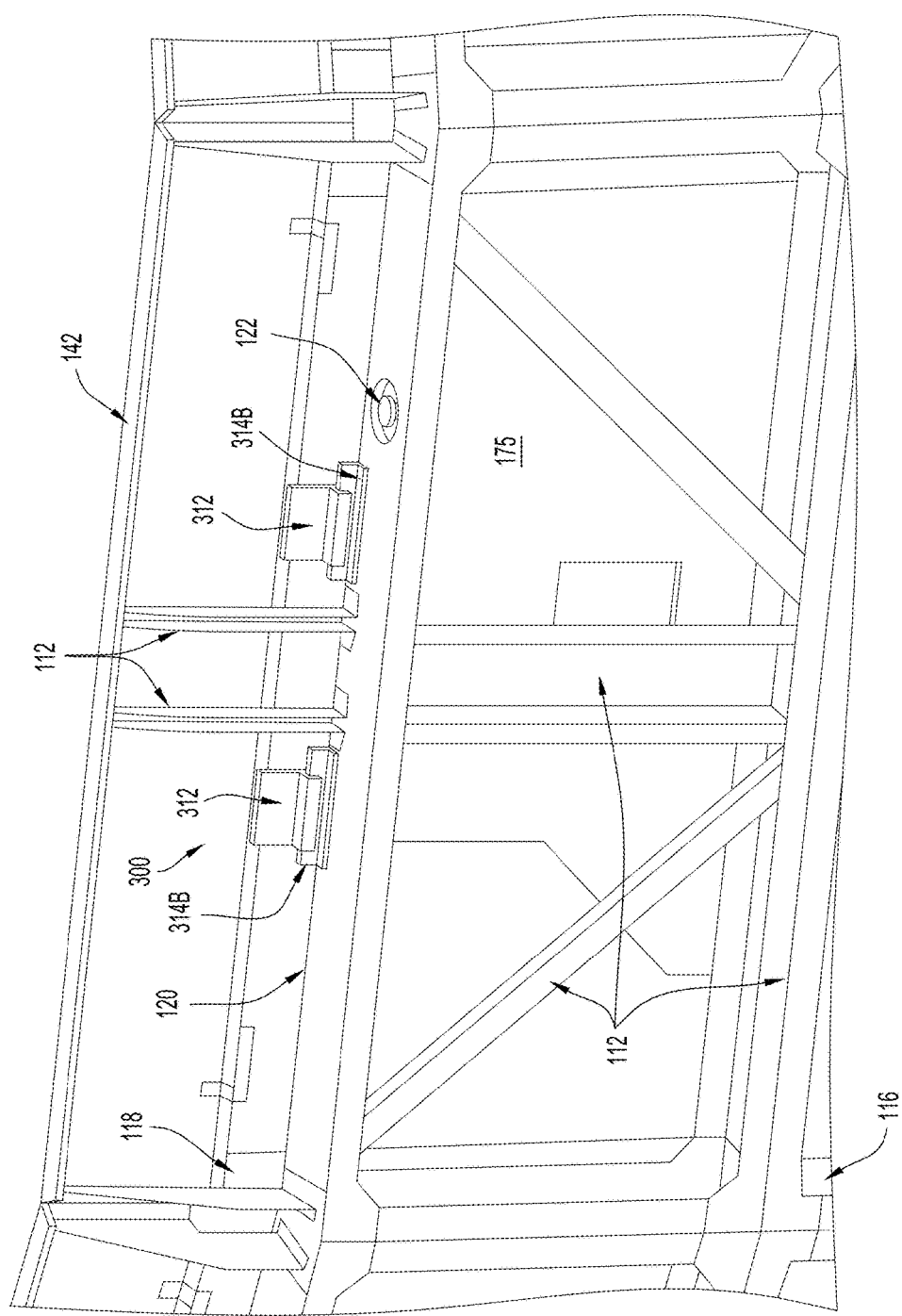
FIGS. 3 and 4 are rear perspective views of central and side portions of a video conference endpoint in accordance with an example embodiment.
Figure 4:
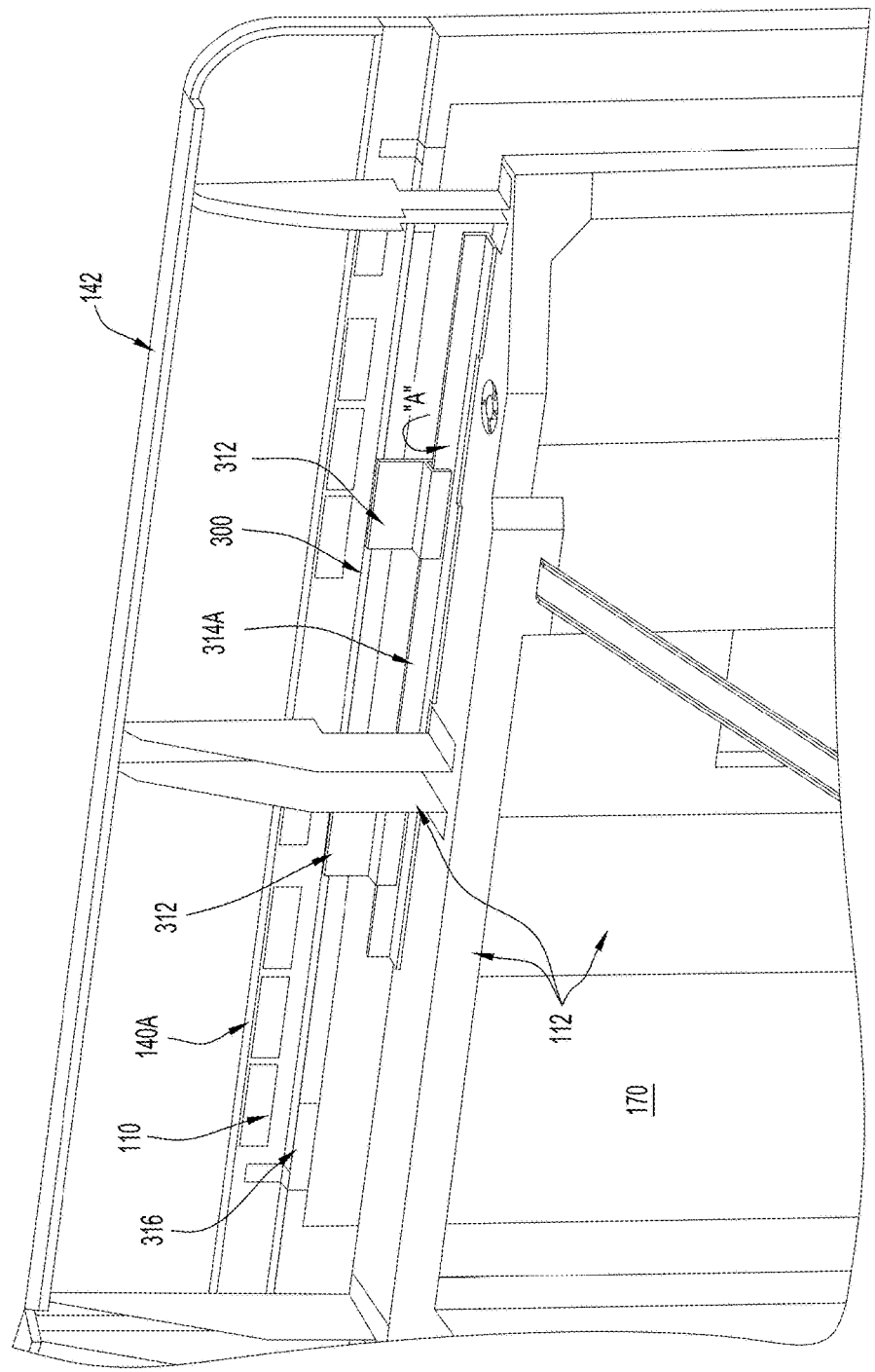

FIG. 3 shows a rear perspective view of the upper portion 118 of the central section 120, while FIG. 4 is a rear perspective view of the upper portion 118 of the first side section 110. Although only the first side section 110 is shown in FIG. 4, it is to be understood that features shown in FIG. 4 may be representative of the features included on both of the side frame sections 110, 130. As shown in FIGS. 3 and 4, the upper portion 118 of frame 108 includes various support members 112 configured to ensure the frame 108 is structurally sound and able to support various relatively large and heavy displays. FIGS. 3-4 also show a display mounting mechanism 300 that is configured to receive and support displays 170, 175, and 180 (shown in FIG. 1). That is, the mounting mechanism 300 is configured to couple or mount the displays to the frame 108.

As described further below, the mounting mechanism 300 forms part of a display mounting system that allows displays 170, 175, 180 to be movably mounted to the frame 108 so that the orientation of a display 170, 175, 180 may be easily adjusted with respect to the frame 108. Additionally, the display mounting system enables the displays 170, 175, 180 to be easily configured, electrically connected, and otherwise set up for operation. Also as described further below, the display mounting system utilizes dimensional control of display locating features to limit the display orientation alignment adjustments to two adjustments per each side display 170 and 180 (i.e., four total adjustments for the 3-display endpoint). For each side display 170 and 180, one adjustment is used to make the adjacent vertical edge of the respective side parallel to the adjacent vertical edge of the center display 175. The second adjustment is used to align the horizontal edge of the respective side display at a desired angle with respect to the center display and to simultaneously align the outside vertical edge of the respective side display with the adjacent exterior cosmetic cover in the front-back direction.

In the example of FIG. 3, the mounting mechanism 300 is a hook-and-rail system that includes a pair of central rails 314B mounted on the central portion 120 and side rails 314A mounted on the side frame sections 110, 130. Each of the rails 314A, 314B is configured to be engaged by hooks 312 of the mounting mechanism 300 that may be included or mounted on a display in a manner which provides the displays with at least one degree of freedom and possibly two degrees of freedom. In some embodiments, the mounting mechanism may also include a large bracket or plate mounted to the back of a display that may include or be configured to receive the hooks 312. A large bracket or plate may also include a mounting location for display electronics if desirable. However, in other examples, mounting mechanism 300 may have other arrangements. As is described in further detail below, in some embodiments, the mounting mechanism 300 is used to temporarily hang the displays 170, 175, 180 as needed, such as during connection of the display power and data cables. Additionally, the mounting mechanism may serve as a safety 'catch', so that if the displays 170, 175, 180 were to slide off their supports 350 and 420—in a seismic event, for instance—the displays would still be constrained vertically.

Figure 15:
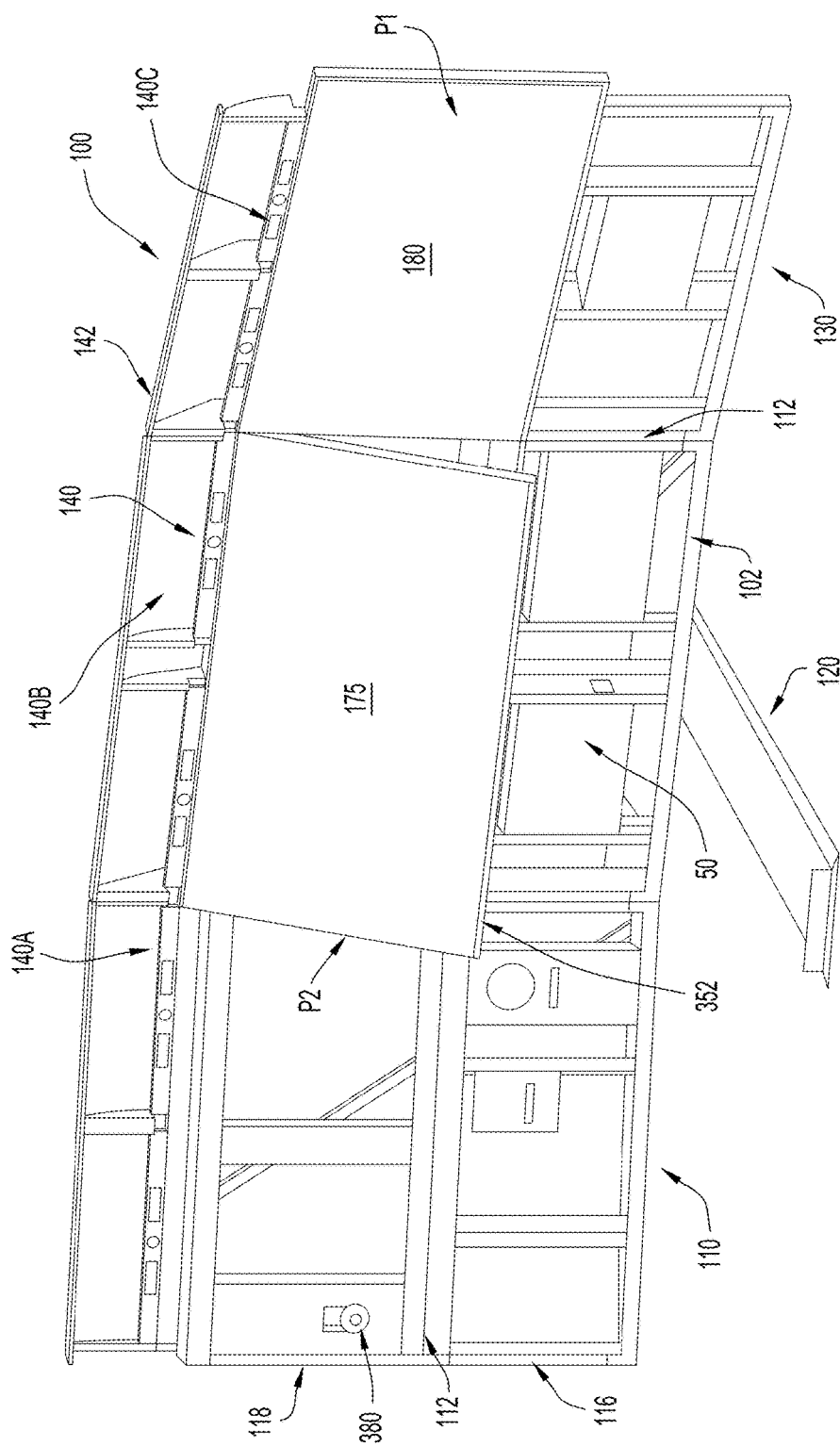
FIG. 15 is a front perspective view of a video conference endpoint that illustrates the temporary hanging of displays in accordance with an example embodiment.

The mounting mechanism 300 rotatably couples the displays to frame 108 such that the display may be rotated or pivoted away from the frame 108 in a front/back direction. In the example of FIG. 3, the displays 170, 175, 180 may rotate about the rails 314A, 314B in order to move the bottom of a display 170, 175, 180 away from the frame 108 (as shown in FIG. 15). In some examples, a hook 312 may be coupled to the back of a display 170, 175, 180 and configured to be rotated in accordance with directional arrow "A" (shown in FIG. 4) in order to move the bottom of a display away from the frame 108. In order to provide this rotation, the hook 312 may only extend over the top and one side of a rail 314A, 314B. Alternatively, if the hook 312 extends on the both sides of the rail, the hook may only engage a portion of a second side of the rail. In other words, the portion of the hook 312 that engages a rail 314A, 314B may be J-shaped or L-shaped, rather than U-shaped. However, in other examples, hooks 312 may be any desirable shape which provides or allows for rotation in accordance with directional arrow "A." Generally, rotating the displays 170, 175, 180 in accordance with directional arrow "A" may allow a user to access any input areas included on the back side of a display 170, 175, 180 for cabling/wiring or any other set up.

Still referring to FIGS. 3 and 4, the mounting mechanism 300 may also be configured to enable a display mounted thereon to slide or otherwise move laterally with respect to the frame 108, at least prior to being further secured to the frame 108. However, in some examples, it may be desirable to laterally restrain at least the display 175 installed on the central portion 120 of the frame 108. Accordingly, the mounting mechanism 300 may include central rails 314B that are similarly sized to one of the hooks 312. Sizing the rails 314B in this manner may cause the hooks 314 to cover a substantial portion of the length of rails 314B when they are installed thereon, thereby eliminating or minimizing the amount of lateral travel afforded to the hooks 314 mounted on rails 314B. By comparison, and as shown in FIG. 4, the side rail 314A may extend along a substantial length of the side portion 110, such that hooks 312 included on a side display (i.e., displays 170 and 180) may be afforded a larger range of lateral movement if desired. An extended side rail 314A may, in some examples, also enable side displays 170, 180 to slide onto the frame from a side position when the side displays 170, 180 are mounted thereon.

Figure 5:
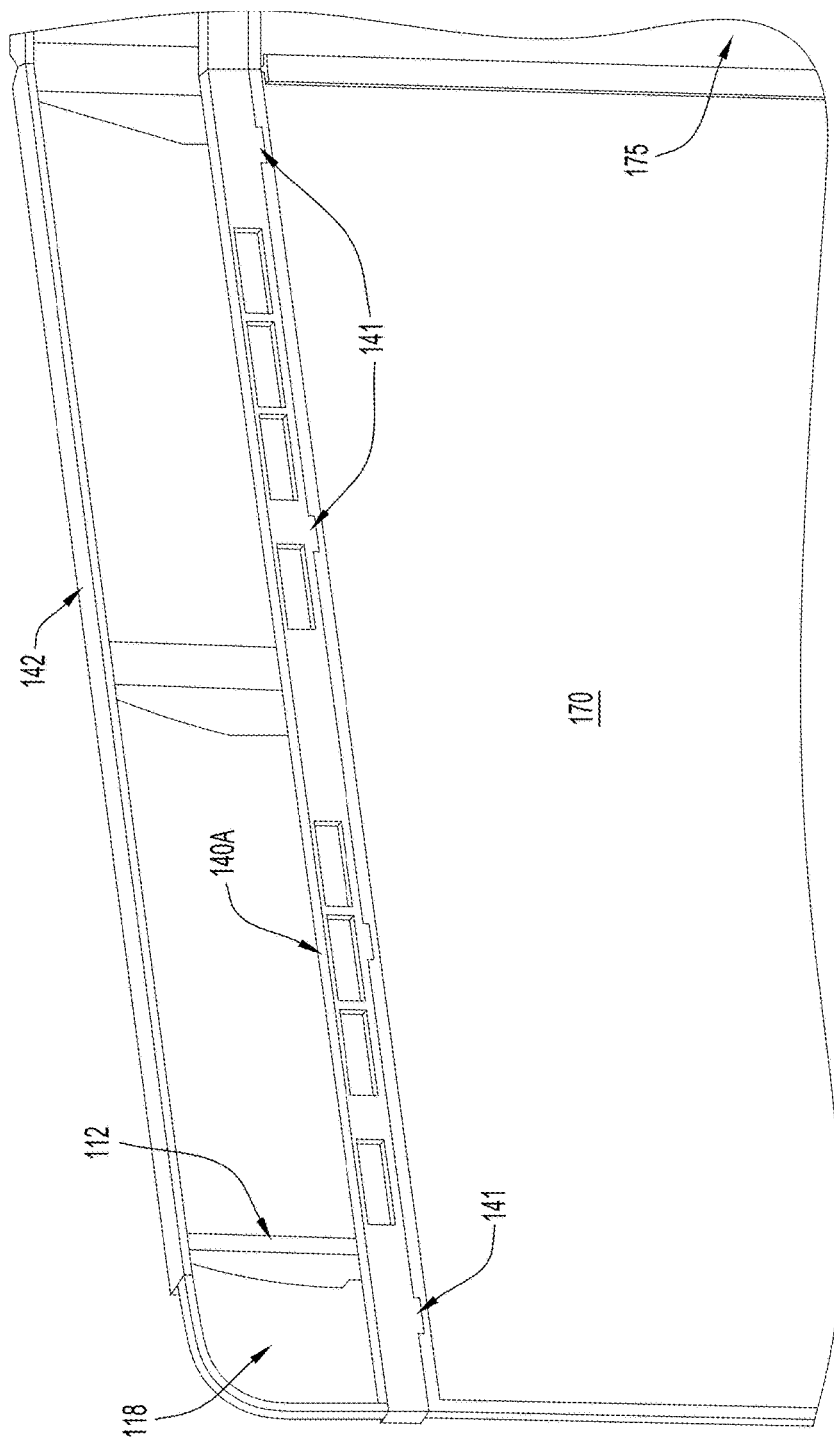
FIG. 5 is a front perspective view of a top portion of a video conference endpoint in which the cosmetic covering is completely removed, in accordance with an example embodiment.
Figure 6:
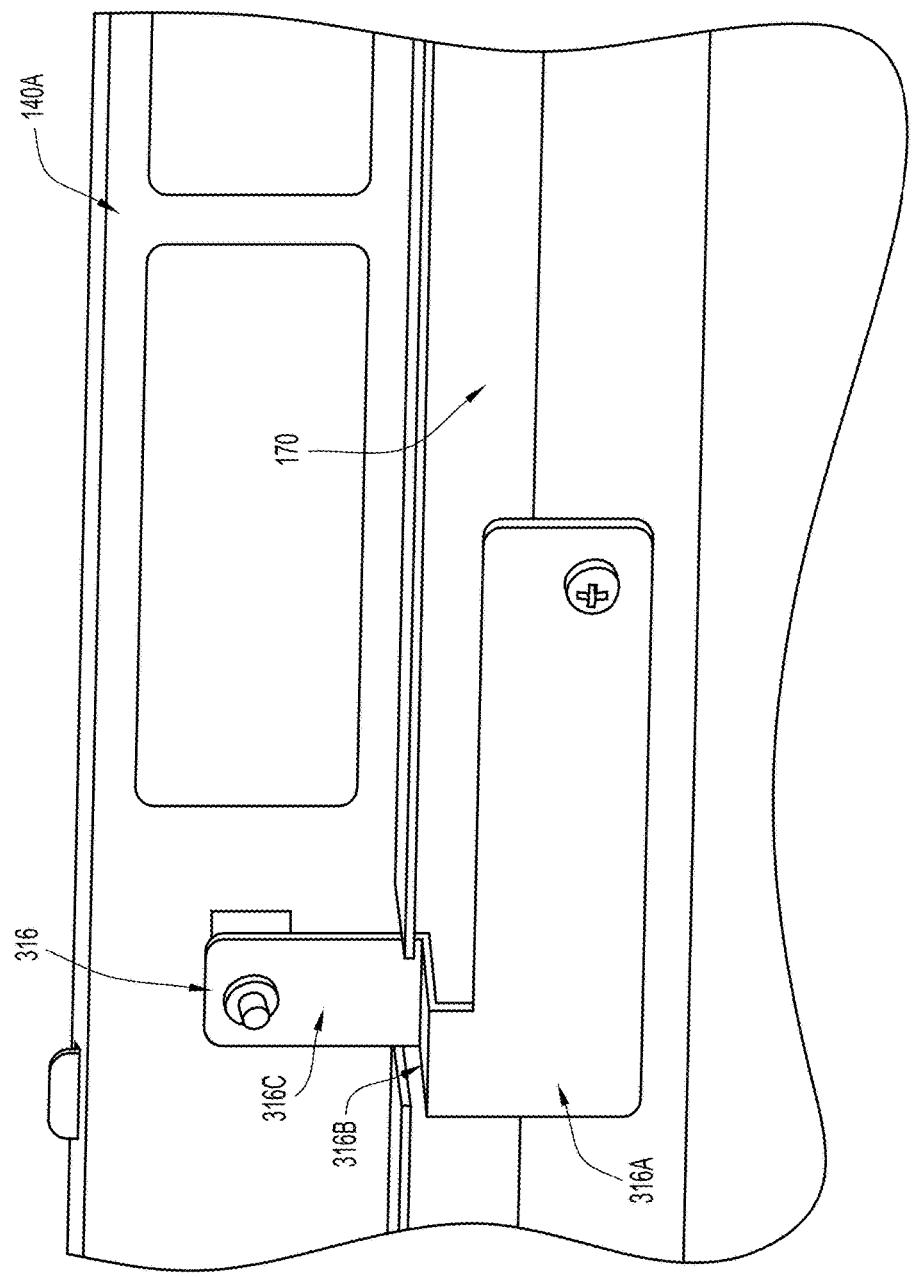
FIG. 6 is a close-up perspective view of a coupler configured to couple displays to the frame in accordance with an example embodiment.

Reference is now made to FIGS. 5 and 6. The cross bar 140 portion of the mounting mechanism 300 may provide further features which allow displays 170, 175, and 180 to be coupled to the frame 108. As shown in FIG. 5, cross bar section 140A includes a number of tabs 141 configured to engage display 170. Tabs 141 may be included on any section 140A, 140B, or 140C of the cross bar and are preferably included on each of the sections 140A, 140B, and 140C. The tabs 141 are configured to engage a top portion of a front surface (i.e., the exposed surface) of the displays 170, 175, 180 once the displays 170, 175, 180 and cross bar 140 are mounted on the frame 108. The tabs 141 may enable a user to register or align the top of a display with the cross bar 140. For example, in the depicted embodiment, the cross bar 140 is fixed in the front-back direction by the upper frame portion 118, and the tops of the displays are aligned front-to-back to the cross bar tabs 141. Mounting mechanism 300 has sufficient play in the hooks 312 to allow for fine position control of the displays 170, 175, 180 with respect to tabs 141.

Once aligned, the back sides of the displays 170, 175, 180 may be secured to the cross bar 140 in order to securely couple the displays 170, 175, 180 to the frame 108 (via the cross bar 140, which is secured to frame 108 prior to the displays 170, 175, 180 being secured thereto). In this example, the cross bar 140 is secured to the frame 108 via support members 112 that are extending between the top 142 and a support member 112 of the upper frame portion 118 that is extending substantially horizontally and the cross bar 140 is coupled to the back side of the displays 170, 175, 180 via a coupler 316. However, any desirable fasteners or coupling methods, such as machine screws, may be used in order to couple or secure these parts together.

As shown in FIG. 6, in certain examples the coupler 316 is substantially Z-shaped and includes a first section 316A configured to be disposed substantially flush to the back side of the displays 170, 175, 180, such that the first section may be mounted thereto, a second section 316B configured to be disposed substantially flush to the top of the displays 170, 175, 180, and a third section 316C configured to be disposed substantially flush to the cross bar 140. In other examples, any desirable coupler 316 may be utilized to couple the cross bar 140 to the rear of a display. A Z-shaped coupler 316 may be used at least because it may minimize the amount of protrusions that may interfere with cosmetic covering 190.

Regardless of how the cross bar 140 is coupled to the displays 170, 175, 180, once the cross bar 140 is secured to the displays 170, 175, 180 and the support frame 108, the displays 170, 175, 180 may be substantially locked or secured in place, at least along their top edges. In other words, the top edges or portions of the displays 170, 175, 180 may be fixedly secured to the frame 108 via the cross bar 140 once a cross bar section 140A, 140B, 140C is secured to a corresponding display 170, 175, 180 and to a corresponding section 110, 120, and 130 of the frame. Accordingly, during installation, it may be desirable to adjust the orientation of the displays 170, 175, 180 prior to fully securing the cross bar 140 to the frame 108. However, in some examples, the orientation of the displays 170, 175, 180 may still be adjustable, at least slightly, even after the displays 170, 175, 180 are secured to the frame 108 via cross bar 140.

As noted above, once the displays 170, 175, 180 are secured to the cross bar 140, each side display 170, 180 is limited to only two display orientation alignment adjustments (i.e., four total adjustments for the 3-display endpoint). More specifically, one adjustment is used to make the adjacent vertical edge of the respective side parallel to the adjacent vertical edge of the center display 175. The second adjustment is used to align the horizontal edge of the respective side display at a desired angle with respect to the center display 175 and to simultaneously align the outside vertical edge of the respective side display with the adjacent exterior cosmetic cover in the front-back direction. Exemplary features and mechanisms that enable or provide orientation adjustments are shown in FIGS. 7-10.

Figure 7:
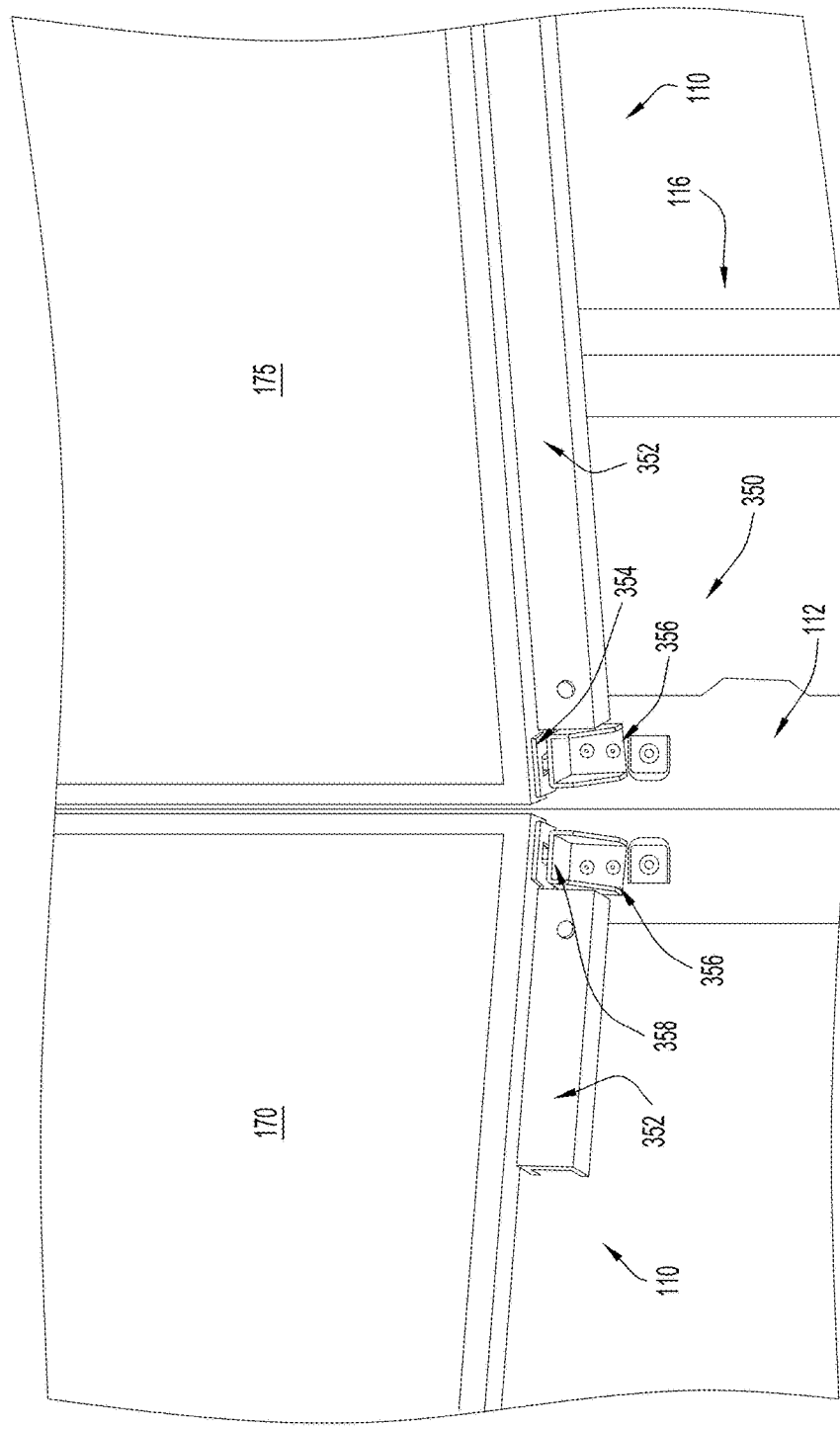
Figure 9B:
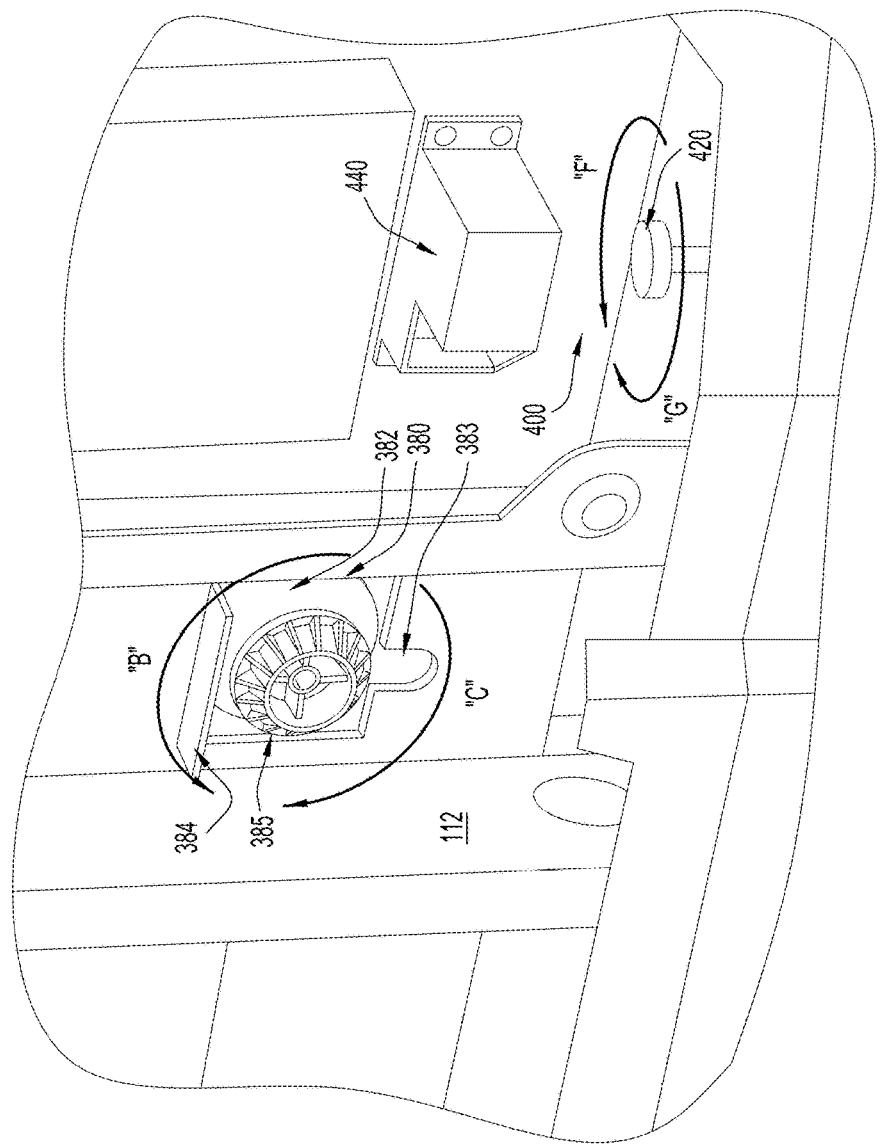
Figure 10:
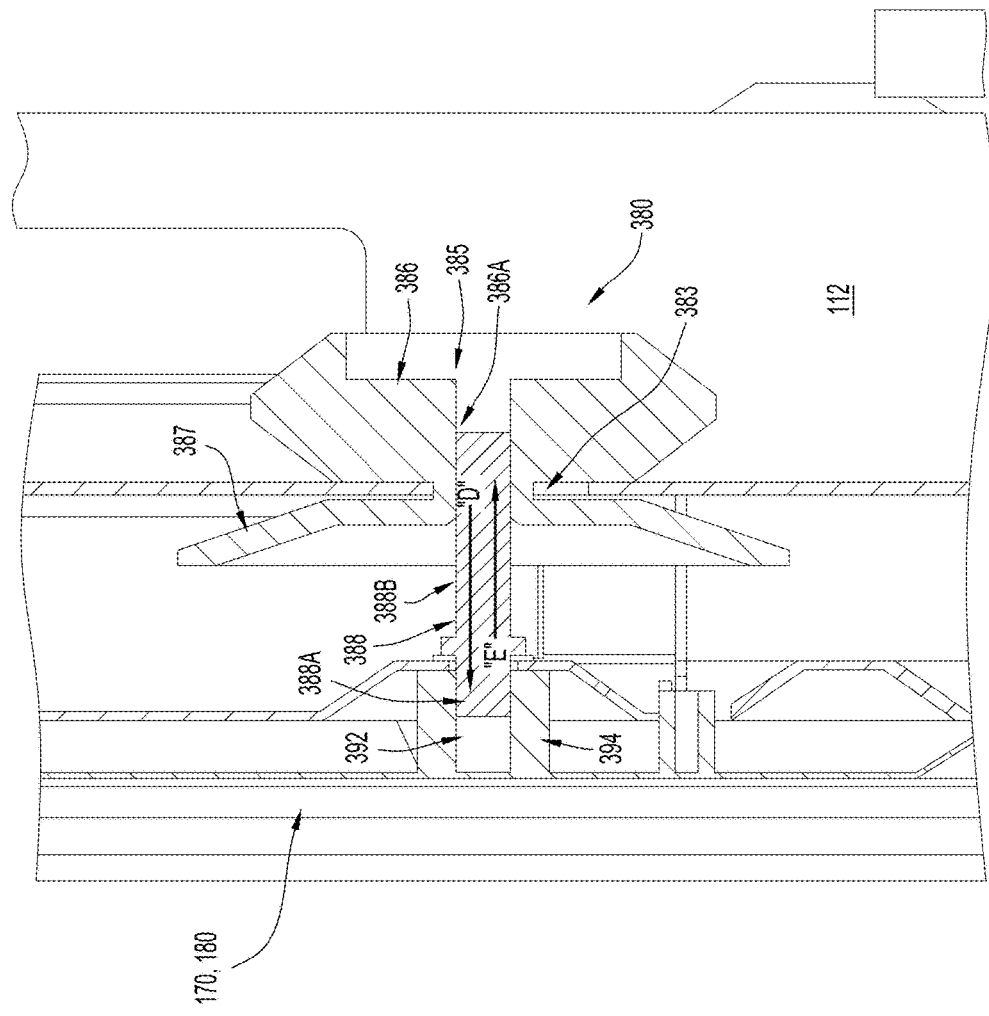
FIG. 10 is a sectional view of a rotational adjustment mechanism in accordance with an example embodiment.
Figure 11:
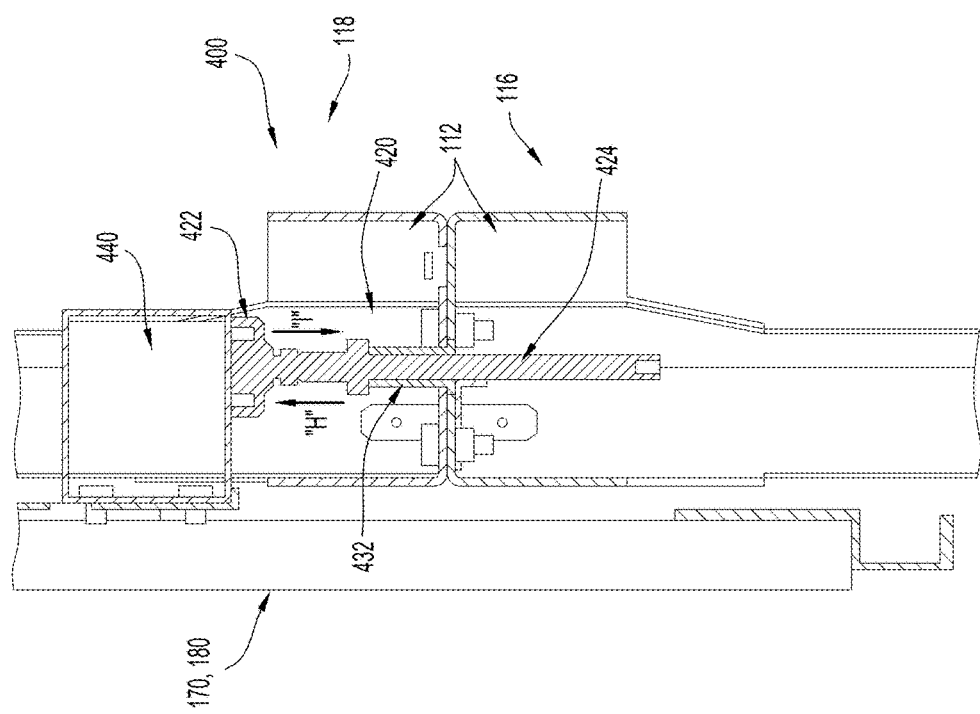
FIG. 11 is a sectional view of a leveling mechanism in accordance with an example embodiment.

More specifically, FIGS. 7 and 8 illustrate support brackets 350 which allow rotational adjustment of the first and third displays 170, 180 with respect to the central display 175 while FIGS. 9A, 9B and 10 show a rotational adjustment mechanism 380 and FIGS. 9A, 9B, and 11 show a leveling mechanism 400. As will be explained in detail below, the leveling mechanism 400 may be used to tilt a side display 170, 180 with respect to the central display 175 by vertically adjusting the outer edge of a side display 170, 180 and the rotational mechanism 380 may allow the displays to be rotated about the trim 200 while pivoting on the support brackets 350 such that the side displays 170, 180 may be rotated with respect to the central display 175 and/or a cosmetic covering. In certain examples, mechanisms 380 and 400 provide fine adjustments, but in other examples, mechanisms 380 and 400 may provide adjustments in any desirable direction over any desirable range of movement. In some embodiments, mechanism 380 may provide a range of adjustments spanning approximately 16 mm (e.g., +/−8 mm of front-back motion) and mechanism 400 may provide a range of adjustments spanning approximately 71 mm (e.g., +57 mm/−14 mm of vertical travel).

Now referring specifically to FIGS. 7 and 8, brackets 350 supporting the first display 170 and central display 175 are shown. It is understood that brackets 350 that may be also included on or between the second side display 180 and the central display 175. As shown, the brackets 350 include stanchions 356 that are configured to support lateral members 352. The stanchions 356 are each coupled to a support member 112 included in the lower portion 116 of the frame 108 and the lateral support members 352 are provided with or coupled to the bottom edges of displays 170, 175. In certain examples, each section 110, 120, and 130 of the frame includes a stanchion 356 on an edge that abuts another section 110, 120, and 130. Consequently, in this example, the central section 120 includes a stanchion 356 on each of its sides or edges and the side sections 110, 130 include a single stanchion 356 disposed adjacent the stanchion included on the central section 120. In other words, each side display 170, 180 includes a stanchion on its inner side or edge. However, in other examples any desirable arrangement of stanchions 356 may be used to support displays 170, 175, 180 mounted to an endpoint. For example, in some examples, a single stanchion may support two adjacent displays 170, 175, 180.

The stanchions 356 may each include an engagement portion 358 configured to engage an engagement portion 354 of the lateral support member 352. As best shown in FIG. 8, the engagement portions 354 extend substantially perpendicularly to the display 170, 175, 180 on which it is mounted. The engagement portion 358 extends substantially perpendicularly to the frame 108 such that when the stanchion 356 and lateral member 352 are arranged in the manner as shown in FIGS. 7 and 8, the stanchions may support a lower portion of a display 170, 175, 180. Consequently, the brackets 350 may urge the adjacent displays 170, 175, 180 to be horizontally aligned, at least along their lower edges. In certain examples, the brackets 350 may also provide a pivot point about which an outer display 170, 180 may rotate so that the display may be rotationally adjusted with respect to the central display 175.

As best shown in FIG. 8, in some examples the engagement portion 358 of the stanchion 356 includes a protrusion 359 which may serve as a pivot point for the side displays 170, 180. The protrusion 359 extends upwards from the engagement portion 358, such that a lateral member 352 engaging the stanchion 356 rests on the protrusion 359. The protrusion 359 may be substantially arcuate or dome-shaped. However, since the central display 175 is, in certain examples, supported by two stanchions 356 (i.e., one on each side), the central display may not be configured to rotate on the stanchions 356 even if the stanchions include protrusions 359. By comparison, the side displays 170, 180 only rest on a single stanchion 356 and, thus, may be configured to be rotatably or angularly adjusted with respect to the central display 175. In some examples, the side displays 170, 180 may be configured to rotate freely with respect to the central display at certain stages of installation (i.e., before the cross bar sections 140A, 140C are installed thereto and coupled to the frame 108), but in other examples the side displays 170, 180 may only be selectively rotatable and may be locked or prevented from rotating when desired. In certain examples, the rotational relationship provided between the lateral member 352 and stanchion 356 simply enables an adjustment mechanism to perform fine rotational adjustments of the side displays 170, 180, as is described in more detail below.

Now turning to FIGS. 9A, 9B, and 10, a rotational adjustment mechanism 380 that may be provided or included with the endpoint 100 of the present invention is shown from rear and sectional views. As shown in FIG. 9B, the rotational adjustment mechanism 380, which may be alternately referred to simply as the rotational mechanism 380, includes a user-manipulable control 385 configured to engage a support member 112 of the frame 108 via an opening 382 that includes a necked portion 383. In FIG. 9B, the control 385 is shown removed from the necked portion 383 for clarity, however, and in FIGS. 9A and 10, the control 385 is shown disposed within the necked portion 383. However, in order to install the control 385, the control may initially be inserted into the opening 382 and slid into the necked portion 383. As indicated in FIG. 9B, once installed, the control 385 may be rotated in accordance with directional arrow "B" or "C" in order to adjust the rotational or angular orientation of a side display 170, 180 that it is installed onto frame 108.

As shown in FIG. 10, in order to make angular adjustments, the control 385 includes a portion 386 that is coupled to a flange 387 and configured to receive and engage a central stud 388. The portion 386 and the flange 387 are configured to engage opposite sides of the support member 112. Accordingly, once the control 385 is disposed in the necked portion 383, the control 385 may be constrained in the front-to-back direction and may only move in the front-to-back direction once slid into the opening 382. The control 385 is only free to rotate within the necked portion 383, thus causing the control 385 to interact with stud 388 that may be received through a central bore included in the portion 386. As shown in this example, the stud 388 includes a first threaded section 388A and a second threaded section 388B. The second threaded section 388B may engage a threaded portion 386A of the portion 386 that surrounds the central bore and the first threaded section 388A may engage and be secured to threaded walls 394 of a receiver 392 included on a rear surface of the side display 170, 180. Thus, the stud 388 may be fixed to a side display 170, 180 and the portion 386 may be fixed to a support member 112, such that movement of the stud 388 causes the side display 170, 180 to move towards or away from the support member 112.

More specifically, since the support member 112 is generally fixed in place, when the control 385 is spun in accordance with directional arrow "B" or "C," (in FIG. 9B) the stud 388 may be driven or moved laterally with respect to the frame 108. When the control 385 is rotated in accordance with directional arrow "B," stud 388 may move in accordance with directional arrow "D" and when the control 385 is rotated in accordance with directional arrow "C," stud 388 may move in accordance with directional arrow "E." Movement of the stud 388 may, in turn, cause the side display 170, 180 to be driven or moved with the stud 388. Consequently, when a rotation adjustment mechanism 380 is disposed substantially adjacent or substantially proximate the outside portion of a side display 170, 180, (i.e., on the opposite side from brackets 350) as shown in FIG. 9A, the rotation adjustment mechanism 380 may cause a side display 170, 180, or at least a portion thereof, to rotate with respect to the center display 175. Notably, when a section of the cross bar 140 has already been installed onto a side display 170, 180, the top of the display may be fixed in place. In these instances, the rotational adjustment mechanism 380 may move a lower portion of a side display 170, 180 into vertical alignment with either the top of the display 170, 180 or at least a portion cosmetic cover 190 included on the endpoint 100. For example, in some embodiments, the rotational adjustment mechanism 380 may move the lower portion of a side display 170, 180 into alignment with a portion of the cover 190 that extends along the side of the endpoint 100, which may be referred to as a side cover (not shown).

The leveling mechanism 400 is now described with reference to FIGS. 9A, 9B, and 11. The leveling mechanism 400 may be configured to move or adjust a side display 170, 180 in a similar manner to the rotational adjustment mechanism 380 (i.e., by moving a stud-type insert via a threaded engagement). However, in contrast to the rotational adjustment mechanism 380, the leveling mechanism 400 may be configured to move or adjust a side display 170, 180 within a vertical plane. More specifically, and as is shown best in FIG. 11, the leveling mechanism 400 includes a movable member 420 with a threaded portion 424 configured to engage a threaded boss 432 included in at least one support member 112. In the depicted example, the boss 432 is included in a support member 112 that extends substantially horizontally along the bottom of the upper portion 118. The boss 432 may also be aligned with an opening in a support member 112 that extends substantially horizontally along the top of the lower portion 116 such that to movable member 420 received in the boss 432 may extend vertically between the lower portion 116 and the upper portion 118 of the frame 108. Providing the boss 432 in such a location may allow the leveling mechanism 400 to align the bottom of a side display 170, 180 with the lower edge of the upper portion 118 of the frame 108 which, in some examples, may align a side display 170, 180 with the center display 175 and/or cosmetic covering 190.

In order to facilitate adjustments, the movable member 420 may include an engagement portion 422 that may engage a block 440 that is mounted to or included with a side display 170, 180 in order to support at least a portion of the side display 170, 180. The engagement portion 422 may also be moved to allow a user to spin the movable member 420 in accordance with either directional arrow "F" or "G" as shown in FIG. 9B. When the movable member 420 is turned in accordance with directional arrow "F," movable member 420 may move substantially upwards in accordance with directional arrow "H" (FIG. 11) and when the movable member 420 is turned in accordance with directional arrow "G," movable member 420 may move substantially downwards in accordance with directional arrow "I" as shown in FIG. 11. Consequently, when the movable member 420 is supporting a side display 170, 180, rotating the movable member 420 in accordance with directional arrow "F" may move the supported portion of the display 170, 180 upwards, and rotating the movable member 420 in accordance with directional arrow "G" may move the movable member 420 out of engagement with the display 170, 180 so that gravitational forces may move the previously supported portion of the display 170, 180 downwards.

As shown in FIG. 9A, the leveling mechanism 400 may be disposed adjacent to an outer edge of a side display 170, 180 (i.e., on the opposite side from brackets 350). As such, raising or lowering a supported portion of a side display 170, 180 may serve to tilt a display, instead of simply moving the entire display vertically. In other words, adjusting the leveling mechanism 400 by rotating the movable member 420 may, in certain examples, allow a user to level a side display 170, 180 with respect to the horizontal axis. Moreover, since the central display 175 is supported by brackets 350 at both of its lower outer edges, the central display 175 may be consistently level. Therefore, leveling a side display 170, 180 with respect to the horizontal axis may also serve to align the side displays 170, 180 with the central display 175, as well as any cosmetic covering 190. Additionally, leveling a side display 170, 180 may allow the inside vertical edge of a side display 170, 180 to be made parallel to the adjacent vertical edge of the center display 175, as is described in more detail below.

Figure 12:
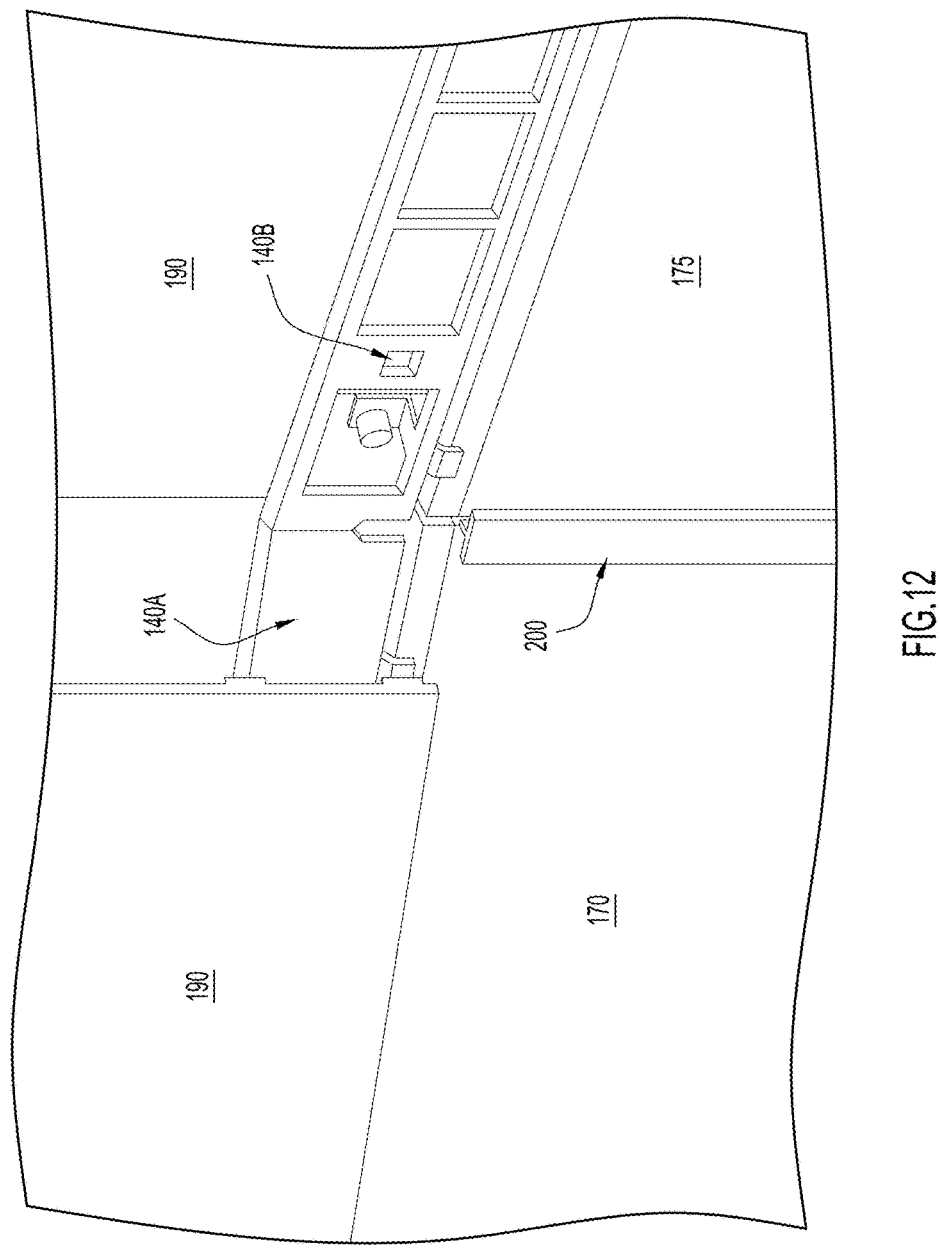
FIG. 12 is a front perspective view of a top portion of a video conference endpoint in accordance with an example embodiment including a portion of a cosmetic cover.
Figure 13:
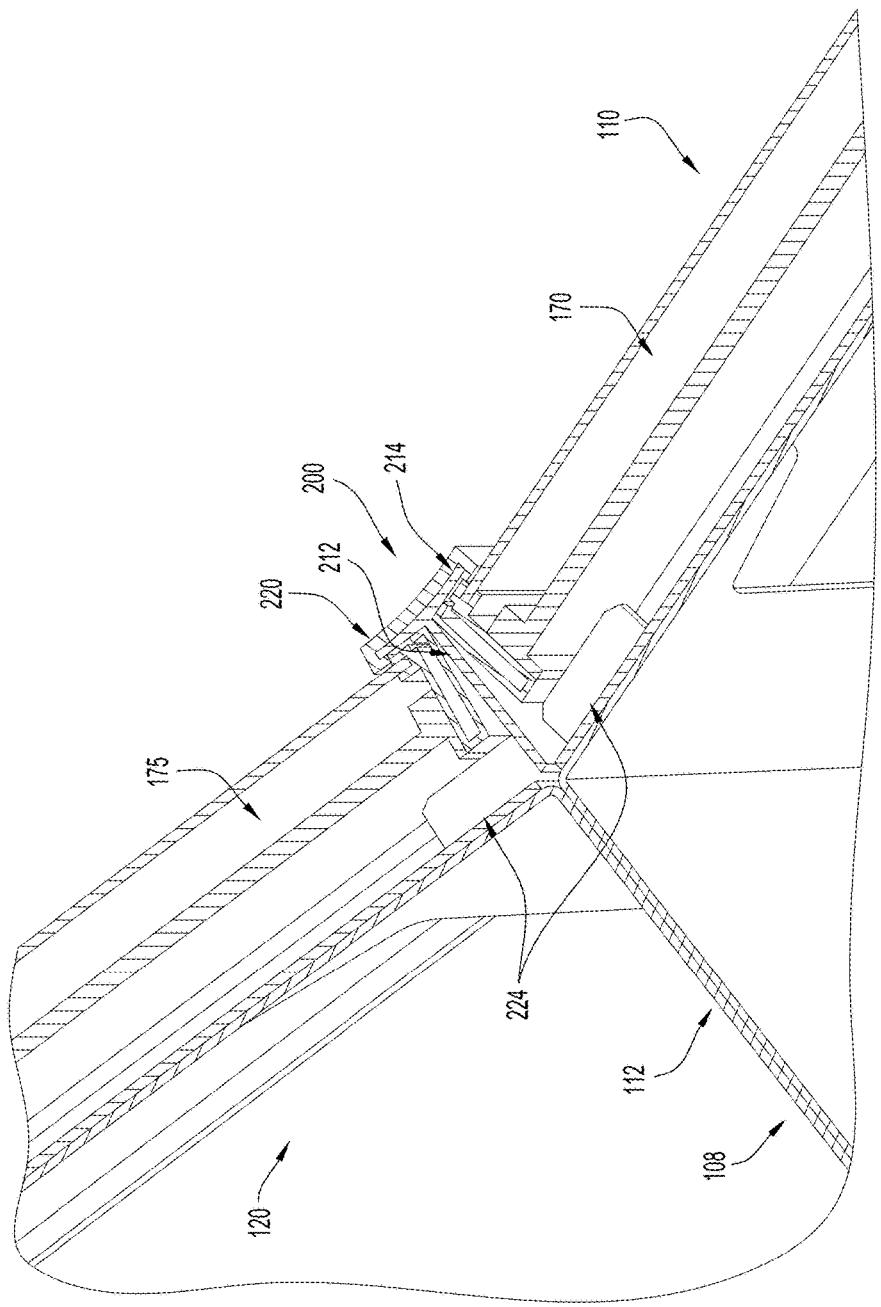
FIG. 13 is a top perspective sectional view of a top portion of a video conference endpoint in accordance with an example embodiment.

Turning to FIGS. 12 and 13, at least a portion of trim 200 is shown. As shown in FIG. 12, together with the cosmetic covering 190, the trim 200 may cover any exposed portions of the frame 108 and/or gaps between displays 170, 175, and 180. However, in FIG. 12 a portion of the cosmetic covering 190 is removed in order to show how the trim 200 may be aligned with the sectional breaks of the frame 108 and the cross bar 140. In FIG. 13, the trim 200 is shown from a top view in order to highlight how the trim 200 may extend between two displays and/or how the trim 200 may be installed.

As shown in FIG. 13, the trim coverings 200 include an insert member 212 with a flared section 214. In certain examples, the insert 212 extends between a side display 170, 180 and the central display 175 and extends from the front surface of the displays to or towards the frame 108. The flared section 214 of the insert 212 may extend over a small portion of the displays 170, 175, 180, but may only cover a frame of the displays 170, 175, 180 such that none or a minimal portion of the images displayed on the displays 170, 175, 180 are obscured or otherwise blocked. Since the flared portion 214 extends over a portion of the front of the displays 170, 175, 180, once the insert 212 is installed, the insert 212 may serve to further secure the displays 170, 175, 180 in place against the frame 108 by clamping the displays 170, 175, 180 against the frame 108. However, as shown, the trim 200 only extends between displays 170, 175, 180 and, thus, does not secure the outer edges of the side displays 170, 180 to the frame 108. Instead, the trim 200 secures the inner edges of the outer side displays 170, 180. When the trim 200 is installed with the cross bar 140, the trim 200 and cross bar may collectively secure at least two edges of the displays 170, 175, 180 to the frame 108 in order to fixedly secure the displays 170, 175, 180 thereto.

Figure 14:
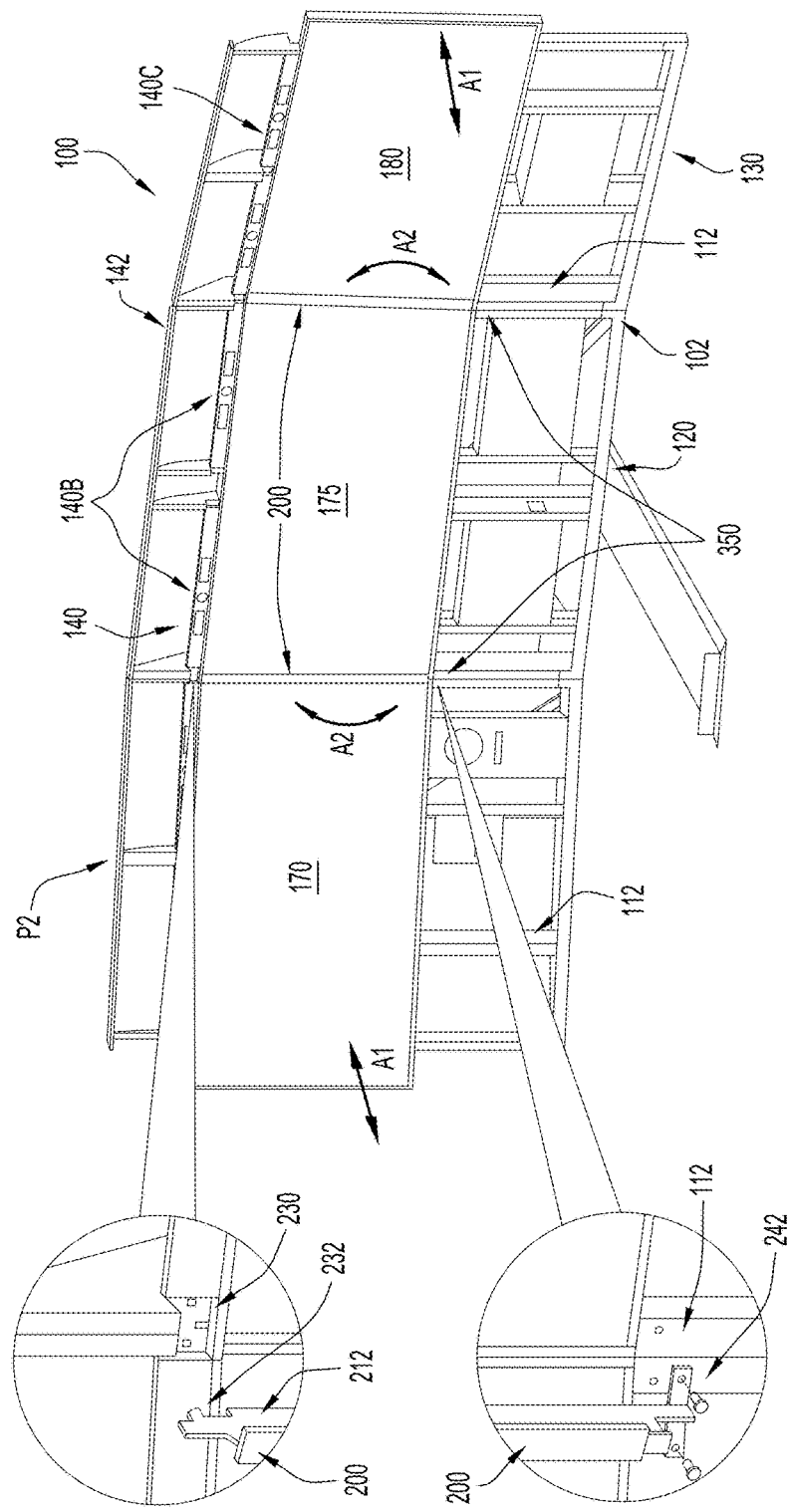
FIG. 14 is a front perspective of the video conference endpoint of FIG. 14 with the displays installed therein, in accordance with an example embodiment.

Turning to FIG. 14 with continued reference to FIG. 13, the frame 108 may include tabs 224 configured to engage the rear of the displays 170, 175, 180 such that the insert 212 tightly secures each display 170, 175, 180 against the frame 108 in a proper alignment. In some examples, the insert 212 may also include or be configured to receive a cover 220 which may blend or match the cosmetic coverings 190 in order to give the endpoint a streamlined appearance. In some examples, the trim 200 may be secured to the tabs 224 with any desirable fasteners in order to secure the trim 200 to the frame 108. However, in other examples, the trim may include any securing features. For example, as shown in FIG. 14, in some examples, the trim 200 may include a hook 232 configured to engage a slot 230 in the frame and a fastening member 242 configured to be secured to a support member 112. In such an example, the top of the trim 200 may be hooked into the frame 108 via hook 232 and slot 230 and then the trim may be installed between the displays 170, 175, 180 and fastened to the frame 108 at its lower end via fastening member 242.

Now turning to FIG. 15 with continued reference to FIG. 14, another example of endpoint 100 is shown and will be used herein to describe a process for installing an endpoint 100.

As shown in FIG. 15, once the support elements 112 are fastened or secured together (e.g., via fasteners such as screws or fastening methods such as welding), the frame 108 may be configured to support a display 170, 175, 180. As such, the displays 170, 175, 180 are initially hung using the mounting mechanism 300 (i.e., the hook and rail system described above) which allows the displays 170, 175, 180 to be rotated or otherwise moved between a display position P1 and an access position P2. In the access position P2, a user may access the connectors and/or inputs on the back of the displays 170, 175, 180 for cabling purposes. The access position may also enable a user to easily access any portion of the frame 108 in order to access or install electronics 50 and associated electrical cables. After cables are connected, the displays 170, 175, 180 may be moved to their display positions P1 and the lower ends of the center display 175 and the inside end of each side display 170, 180 may rest on support brackets 350. At this point the rotational adjustment mechanism 380 and leveling mechanism 400 may be installed onto or engaged with the frame 108 and/or an outer portion of the side displays 170, 180.

As shown in FIG. 14, leveling mechanisms 400 may be used to move the outer edges of the side displays 170, 180 vertically such that the side displays 170, 180 tilt and the inner edge of the side displays may be adjusted in accordance with adjustment arrows A2. These adjustments make the vertical edge of the corresponding side display 170, 180 parallel to the adjacent edge of the center display 175. The rotational adjustment mechanism 380 may be used to move the outer edges of the side displays 170, 180 in accordance with adjustment arrows A1 to move the outer edge of the associated side display 170, 180 forward or backward to enable the display to be oriented at a proper angle with respect to the central display 175 and aligned with the exterior cosmetic cover 190 (see FIG. 1). In some embodiments, the cosmetic cover 190 may include a side cover that extends along any desirable height of the frame 108 and the rotational adjustment mechanism 380 may be used to align the lower portion of the outside vertical edge of a side display 170, 180 to the side cover. The front-back gap between a side cover and side displays 170, 180 can be made even from top to bottom via fine adjustments of the rotational adjustment mechanism 380. During adjustment of the side displays 170, 180 with either a leveling mechanism 400 or a rotational adjustment mechanism 380, the side displays 170, 180 may pivot on the brackets 350 and/or tabs 224.

Once a user has oriented the side displays 170, 180 in a desired alignment (i.e., when the horizontal and vertical edges of all the panels 170, 175, 180 are aligned), additional features, such as cross bar 140 and trim 200 may be secured to the endpoint 100 in order to secure the displays 170, 175, 180 in desired locations and orientations. As shown in FIG. 15, trim 200 may be installed between the right edge of the center display 175 and the left or inner edge of the second side display 180 and between the left edge of the center display 175 and the right or inner edge of the left display 170. The trim 200 may clamp the displays 170, 175, 180 against the endpoint frame 108 in the front-back direction (i.e., the z-axis). Additionally, at the top of the display, a cross bar 140 may be attached to the displays 170, 175, 180 and the frame 108. As described above (and shown in FIGS. 4 and 5) two couplers 316 may be mounted to each display 170, 175, 180 in order to pull each display 170, 175, 180 forward against registration tabs 141 when fasteners are inserted through the cross bar and tightened. The cross bar 140 may also locate an upper cosmetic cover 190 in the front-back direction so there is precise gap control between the display and any cosmetic covering disposed above the displays 170, 175, 180.

In the above installation process, the mounting mechanism 300, support brackets 350, rotational adjustment mechanism 380, leveling mechanism 400, trim 200, and cross bar 140 are all used collectively to mount displays 170, 175, and 180 on a frame 108 in a desired position and orientation. Accordingly, it is to be understood that all of these elements may be collectively referred to as the display mounting system for endpoint 100. However, in some examples, the display mounting system may include only some of these elements or additional elements as desired.

Display mounting systems in accordance with examples presented herein may provide a number of advantages over conventional endpoints. For example, display orientation alignment adjustments are made during installation so as to eliminate unnecessary adjustments. Horizontal alignment between the center display and the inner corners of the side displays can be achieved without the need for adjustment by using closely dimensionally controlled features. Front-to-back alignment of the center and side displays is maintained without the need for adjustment by using closely dimensionally controlled features. A simple adjustment mechanism aligns the outer vertical edge of the side displays to the adjacent cosmetic exterior cover and makes the adjacent vertical edges of the center and side displays parallel. In general, the display mounting systems in accordance with examples presented herein are configured such that the time needed to install the endpoint is greatly is reduced when compared to conventional systems.

In one form, a video conference endpoint is provided comprising: a frame including a central section, a first side section, and a second side section, wherein the first side section and the second side section are disposed on opposite sides of the central section; a first side display, a central display, and a second side display; a display mounting system comprising: a mounting mechanism configured to attach the first side display to an upper portion of the first side section of the frame, attach the central display to an upper portion of the central section of the frame, and attach the second side display to an upper portion of the second side section of the frame; and an adjustment mechanism configured to adjust the orientation of the first side display and the second side display with respect to both the central display and the frame such that edges of the first side display, the second side display, and the central display are aligned.

In another form, a display mounting system for a video conference endpoint is provided comprising: a mounting mechanism configured to movably mount a display to a frame; a first adjustment mechanism configured to rotate the display with respect to the frame; and a second adjustment mechanism configured to tilt the display with respect to the frame.

In still another form, a method is provided of installing displays on a video conference endpoint comprising: mounting a display to a frame with a mounting mechanism that provides at least two degrees of freedom for at least a portion of the display; adjusting the orientation of the display with respect to the frame in a first degree of freedom with a first adjustment mechanism; adjusting the orientation of the display with respect to the frame in a second degree of freedom with a second adjustment mechanism; and securing the display to the frame.

Although the techniques are illustrated and described herein as embodied in one or more specific examples, it is nevertheless not intended to be limited to the details shown, since various modifications and structural changes may be made within the scope and range of the claims.

What is claimed is:

1. A video conference endpoint comprising:
a frame including a central section, a first side section, and a second side section, wherein the first side section and the second side section are disposed on opposite sides of the central section and each of the central section, the first side section, and the second side section includes an upper portion and a lower portion configured to support the upper portion a distance above a ground surface;
a first side display, a central display, and a second side display; and
a display mounting system comprising:
a mounting mechanism configured to attach the first side display to the upper portion of the first side section of the frame, attach the central display to the upper portion of the central section of the frame, and attach the second side display to the upper portion of the second side section of the frame; and
an adjustment assembly comprising:
a first adjustment mechanism configured to engage and vertically move a portion of the first side display proximate an outer edge of the first side display, so that the first side display rolls about a z-axis of the first side section of the frame with respect to the central display and aligns an inner vertical edge of the first side display with an adjacent vertical edge of the central display; and
a second adjustment mechanism configured to engage and horizontally move the portion of the first side display in order to move the outer vertical edge of the first side display into alignment with the frame.

2. The video conference endpoint of claim 1, wherein the mounting mechanism is configured to rotatably attach the first side display to the frame proximate a top edge of the first side display such that, when attached, the first side display may rotate away from the frame between a display position and an access position.

3. The video conference endpoint of claim 1, wherein the mounting mechanism is a hook and rail system comprising:
at least one hook disposed on the back side of each display; and
one or more rails disposed on each section of the frame, wherein the at least one hook is configured to engage at least one of the one or more rails to provide a rotatably movable coupling between each display and the frame.

4. The video conference endpoint of claim 1, wherein the display mounting system further comprises:
a cross bar member configured to engage a top edge of the first side display and the central display; and a trim member configured to engage the inner vertical edge of the first side display- and the adjacent vertical edge of the central display when disposed adjacent to each other, wherein the cross bar member and the trim member are configured to secure the first side display to the frame prior to adjustment, by the adjustment assembly, of an orientation of the first side display.

5. The video conference endpoint of claim 1, wherein the adjacent vertical edge of the central display is a first adjacent vertical edge and the adjustment assembly further comprises:
a third adjustment mechanism configured to engage and vertically move a portion of the second side display proximate an outer edge of the second side display, so that the second side display rolls about a z-axis of the second side section of the frame with respect to the central display and aligns an inner vertical edge of the second side display with a second adjacent vertical edge of the central display; and
a fourth adjustment mechanism configured to engage and horizontally move the portion of the second side display in order to move the outer vertical edge of the second side display into alignment with the frame.

6. A display mounting system for a video conference endpoint comprising:
a mounting mechanism configured to movably mount a top edge of a display to a frame;
a first adjustment mechanism configured to engage and vertically move a portion of the display proximate an outer vertical edge to tilt an inner vertical edge of the display of the display to adjust an orientation of the display with respect to the frame; and
a second adjustment mechanism configured to engage and horizontally move the portion of the display proximate the outer vertical edge of the display to adjust the orientation of the display with respect to the frame.

7. The display mounting system of claim 6, further comprising:
at least one securing member configured to secure at least the top edge of the display to the frame prior to adjustment via the first adjustment mechanism and the second adjustment mechanism.

8. The display mounting system of claim 7, wherein the at least one securing member comprises:
a trim member configured to engage the inner vertical edge of the display; and
a cross bar member configured to engage the top edge of the display.

9. The display mounting system of claim 8, wherein the cross bar member is configured to:
engage the top edge of the display; and
receive a coupler that secures the cross bar member to the display.

10. The display mounting system of claim 8, wherein the trim member is configured to clamp the inner vertical edge of the display to the frame.

11. The display mounting system of claim 6, wherein the mounting mechanism is configured to maintain the display mounted to the frame when the orientation of the display is adjusted by the first adjustment mechanism or the second adjustment mechanism.

12. The display mounting system of claim 6, wherein the display includes a first display and a second display, wherein the mounting mechanism is configured to mount the first display adjacent the second display, and wherein the first adjustment mechanism is configured to vertically move the portion of the first display to tilt the first display with respect to the frame and the second display, and wherein the second adjustment mechanism is configured to horizontally move the portion of the first display to rotate the first display with respect to the frame and the second display such that at least the top edge and the inner edge of the first display are aligned with corresponding edges of the second display.

13. The display mounting system of claim 6, wherein the first adjustment mechanism comprises:
a threaded movable member that is movably coupled to a threaded boss included on the frame, wherein rotation of the threaded movable member with respect to the frame causes the threaded movable member to vertically move the portion of the display.

14. The display mounting system of claim 6, wherein the second adjustment mechanism comprises:
a control with a threaded stud that is fixedly coupled to a back of the portion of the display and rotatably coupled to the frame, wherein rotation of the control with respect to the frame causes the threaded stud to horizontally move the portion of the display.

15. A method of installing displays on a video conference endpoint comprising:
mounting a top edge of a display to a frame with a mounting mechanism that provides at least two degrees of freedom for at least a portion of the display;
adjusting the orientation of the display by engaging and moving a portion of the display proximate a bottom edge of the display to move the bottom edge with respect to the frame in a first degree of freedom with a first adjustment mechanism;
adjusting the orientation of the display by engaging and moving the portion of the display proximate the bottom edge of the display to move the bottom edge of the display with respect to the frame in a second degree of freedom with a second adjustment mechanism; and
securing the display to the frame.

16. The method of claim 15, wherein the mounting comprises:
mounting the display using a hook and rail system configured to allow the display to rotate with respect to a rail while remaining mounted on the frame.

17. The method of claim 15, wherein adjusting the orientation of the display in the first degree of freedom comprises:
using the first adjustment mechanism in order to horizontally move the portion of the display and adjust an angular orientation of the display with respect to the frame.

18. The method of claim 15, wherein adjusting the orientation of the display in the second degree of freedom comprises:
using the second adjustment mechanism in order to vertically move the portion of the display and tilt the display about a front-to-back axis with respect to the frame.

19. The method of claim 15, wherein the display remains coupled to the frame via the mounting mechanism when the orientation of the display is adjusted in the first degree of freedom or the second degree of freedom.

20. The method of claim 15, wherein the display includes a first display and a second display, and adjustment of the first display is performed with respect to the frame and with respect to the second display in order to align at least the bottom edge an inner edge of the first display with corresponding edges of the second display.

* * * * *